US012707476B2

(12) United States Patent
Myung et al.

(10) Patent No.: US 12,707,476 B2
(45) Date of Patent: Aug. 11, 2026

(54) METHOD, USER EQUIPMENT, PROCESSING DEVICE AND STORAGE MEDIUM FOR RECEIVING DOWNLINK SIGNAL, AND METHOD AND BASE STATION FOR TRANSMITTING DOWNLINK SIGNAL

(71) Applicant: LG ELECTRONICS INC., Seoul (KR)

(72) Inventors: Sechang Myung, Seoul (KR); Seonwook Kim, Seoul (KR); Kijun Kim, Seoul (KR); Jaehyung Kim, Seoul (KR); Suckchel Yang, Seoul (KR); Seunggye Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 322 days.

(21) Appl. No.: 18/549,341

(22) PCT Filed: Aug. 7, 2023

(86) PCT No.: PCT/KR2023/011558
§ 371 (c)(1),
(2) Date: Sep. 6, 2023

(87) PCT Pub. No.: WO2024/035027
PCT Pub. Date: Feb. 15, 2024

(65) Prior Publication Data

US 2025/0024463 A1 Jan. 16, 2025

Related U.S. Application Data

(60) Provisional application No. 63/411,563, filed on Sep. 29, 2022, provisional application No. 63/396,185, filed on Aug. 8, 2022.

(51) Int. Cl.
*H04W 72/232* (2023.01)
*H04L 5/00* (2006.01)

(52) U.S. Cl.
CPC ......... *H04W 72/232* (2023.01); *H04L 5/0048* (2013.01); *H04L 5/0055* (2013.01)

(58) Field of Classification Search
CPC ... H04W 72/232; H04L 5/0048; H04L 5/0055
See application file for complete search history.

(56) References Cited

U.S. PATENT DOCUMENTS

2018/0139743 A1 5/2018 Yang et al.
2019/0254110 A1* 8/2019 He ........................ H04W 76/28
(Continued)

FOREIGN PATENT DOCUMENTS

| | | |
|---|---|---|
| EP | 3979720 | 4/2022 |
| EP | 4016909 | 6/2022 |
| WO | 2022-100157 | 5/2022 |

OTHER PUBLICATIONS

PCT International Application No. PCT/KR2023/011558, International Search Report dated Nov. 23, 2023, 11 pages.
(Continued)

*Primary Examiner* — Michael J Moore, Jr.
(74) *Attorney, Agent, or Firm* — LEE, HONG, DEGERMAN, KANG & WAIMEY

(57) ABSTRACT

A common downlink signal of a first cell may be transmitted/monitored on the first cell in a first mode with a first periodicity. A configuration related to a second mode including cell information regarding a second cell associated with the first cell may be provided. Based on transition from the first mode to the second mode, the common downlink signal of the first cell may be transmitted/monitored on the second cell within a first time period.

19 Claims, 13 Drawing Sheets

(56) References Cited

U.S. PATENT DOCUMENTS

| | | | | |
|---|---|---|---|---|
| 2021/0014791 | A1* | 1/2021 | Freda | H04W 52/0251 |
| 2021/0360526 | A1* | 11/2021 | Nagamani | H04W 52/0235 |
| 2022/0217636 | A1* | 7/2022 | Shrivastava | H04W 72/23 |
| 2023/0413178 | A1* | 12/2023 | Sun | H04W 72/232 |
| 2024/0015759 | A1* | 1/2024 | Koskela | H04B 7/0695 |
| 2024/0430908 | A1* | 12/2024 | Sun | H04W 72/11 |
| 2025/0048259 | A1* | 2/2025 | Liu | H04W 52/0258 |
| 2025/0280466 | A1* | 9/2025 | Zhou | H04W 52/0206 |

OTHER PUBLICATIONS

Moderator (Intel Corporation), “Summary #2 for email discussion on energy saving techniques of NW energy saving SI,” R1-2205533, 3GPP TSG RAN WG1 Meeting #109-e, e-Meeting, May 2022, 149 pages.

* cited by examiner (a)

Figure 15:
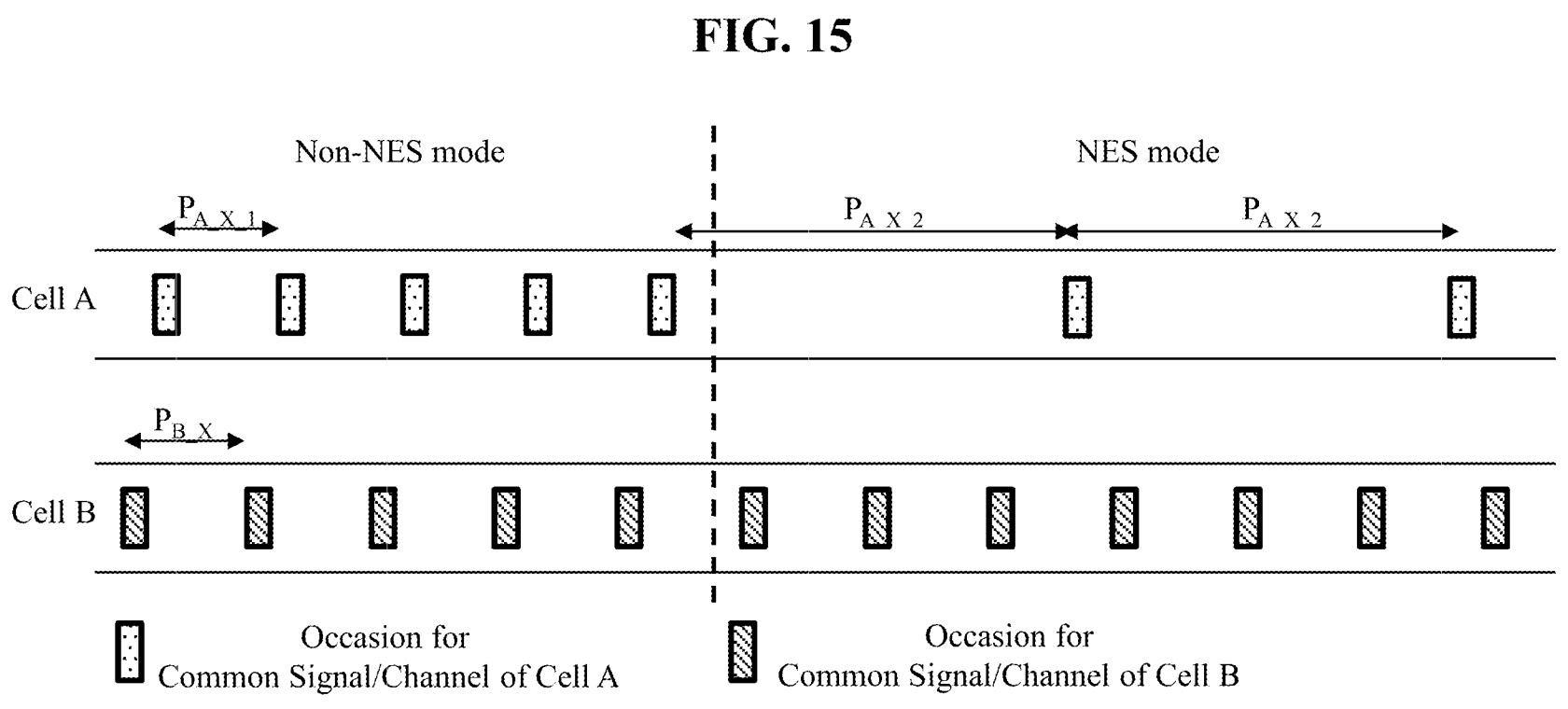

Non-NES mode

NES mode $P_A$ X 1

$P_A$ X 2

$P_A$ X 2

$P_B$ X

Cell A

Cell B

Occasion for Common Signal/Channel of Cell A

Occasion for Common Signal/Channel of Cell B

METHOD, USER EQUIPMENT, PROCESSING DEVICE AND STORAGE MEDIUM FOR RECEIVING DOWNLINK SIGNAL, AND METHOD AND BASE STATION FOR TRANSMITTING DOWNLINK SIGNAL

CROSS-REFERENCE TO RELATED APPLICATIONS

This application is the National Stage filing under 35 U.S.C. 371 of International Application No. PCT/KR2023/011558, filed on Aug. 7, 2023, which claims the benefit of U.S. Provisional Application No. 63/396,185, filed on Aug. 8, 2022, and 63/411,563, filed on Sep. 29, 2022, the contents of which are all incorporated by reference herein in their entirety.

TECHNICAL FIELD

The present disclosure relates to a wireless communication system.

BACKGROUND

A variety of technologies, such as machine-to-machine (M2M) communication, machine type communication (MTC), and a variety of devices demanding high data throughput, such as smartphones and tablet personal computers (PCs), have emerged and spread. Accordingly, the volume of data throughput demanded to be processed in a cellular network has rapidly increased. In order to satisfy such rapidly increasing data throughput, carrier aggregation technology or cognitive radio technology for efficiently employing more frequency bands and multiple input multiple output (MIMO) technology or multi-base station (BS) cooperation technology for raising data capacity transmitted on limited frequency resources have been developed.

As more and more communication devices have required greater communication capacity, there has been a need for enhanced mobile broadband (eMBB) communication relative to legacy radio access technology (RAT). In addition, massive machine type communication (mMTC) for providing various services at anytime and anywhere by connecting a plurality of devices and objects to each other is one main issue to be considered in next-generation communication.

Communication system design considering services/user equipment (UEs) sensitive to reliability and latency is also under discussion. The introduction of next-generation RAT is being discussed in consideration of eMBB communication, mMTC, ultra-reliable and low-latency communication (URLLC), and the like.

SUMMARY

As the number of services/user equipments (UEs) that a network needs to support increases rapidly, the needs for not only power saving for UEs but also energy saving for the network are gradually increasing.

One object of the present disclosure is to provide methods and procedures for network energy conservation.

Another object of the present disclosure is to provide methods and procedures for transmitting downlink signals to achieve network energy conservation.

Another object of the present disclosure is to provide methods and procedures for transmitting minimum system information to achieve network energy conservation.

A further object of the present disclosure is to provide energy conservation methods and procedures for a network, a base station (BS), and/or a user equipment (UE) by reducing transmission of common signals/channels such as a synchronization signal block (SSB), system information block 1 (SIB1), other system information (SI), and/or paging or adjusting the periodicities thereof.

The objects to be achieved with the present disclosure are not limited to what has been particularly described hereinabove and other objects not described herein will be more clearly understood by persons skilled in the art from the following detailed description.

In an aspect of the present disclosure, there is provided a method of receiving, by a user equipment (UE), a downlink signal in a wireless communication system. The method may include: monitoring a common downlink signal of a first cell on the first cell in a first mode with a first periodicity: receiving a configuration related to a second mode, wherein the configuration related to the second mode includes information regarding a time period for the second mode and cell information regarding a second cell associated with the first cell; and monitoring the common downlink signal of the first cell on the second cell within a first time period, based on transition from the first mode to the second mode.

In another aspect of the present disclosure, there is provided a UE configured to receive a downlink signal in a wireless communication system. The UE may include: at least one transceiver: at least one processor; and at least one computer memory operably connected to the at least one processor and configured to store instructions that, when executed, cause the at least one processor to perform operations. The operations may include: monitoring a common downlink signal of a first cell on the first cell in a first mode with a first periodicity: receiving a configuration related to a second mode, wherein the configuration related to the second mode includes information regarding a time period for the second mode and cell information regarding a second cell associated with the first cell; and monitoring the common downlink signal of the first cell on the second cell within a first time period, based on transition from the first mode to the second mode.

In another aspect of the present disclosure, there is provided a processing device in a wireless communication system. The processing device may include at least one processor; and at least one computer memory operably connected to the at least one processor and configured to store instructions that, when executed, cause the at least one processor to perform operations. The operations may include: monitoring a common downlink signal of a first cell on the first cell in a first mode with a first periodicity: receiving a configuration related to a second mode, wherein the configuration related to the second mode includes information regarding a time period for the second mode and cell information regarding a second cell associated with the first cell; and monitoring the common downlink signal of the first cell on the second cell within a first time period, based on transition from the first mode to the second mode.

In another aspect of the present disclosure, there is provided a computer-readable storage medium. The storage medium may be configured to store at least one program code including instructions that, when executed, cause at least one processor to perform operations.

In another aspect of the present disclosure, there is provided a method of transmitting, by a base station (BS), a downlink signal to a UE in a wireless communication system. The method may include: transmitting a common downlink signal of a first cell on the first cell in a first mode with a first periodicity: transmitting a configuration related to a second mode, wherein the configuration related to the second mode includes information regarding a time period for the second mode and cell information regarding a second cell associated with the first cell; and transmitting the common downlink signal of the first cell on the second cell within a first time period, based on transition from the first mode to the second mode.

In a further aspect of the present disclosure, there is provided a BS configured to transmit a downlink signal to a UE in a wireless communication system. The BS may include: at least one transceiver: at least one processor; and at least one computer memory operably connected to the at least one processor and configured to store instructions that, when executed, cause the at least one processor to perform operations. The operations may include: transmitting a common downlink signal of a first cell on the first cell in a first mode with a first periodicity: transmitting a configuration related to a second mode, wherein the configuration related to the second mode includes information regarding a time period for the second mode and cell information regarding a second cell associated with the first cell; and transmitting the common downlink signal of the first cell on the second cell within a first time period, based on transition from the first mode to the second mode.

In each aspect of the present disclosure, the common downlink signal of the first cell may be system information of the first cell.

In each aspect of the present disclosure, the common downlink signal of the first cell may be a paging message.

In each aspect of the present disclosure, the common downlink signal of the first cell may be a synchronization signal block (SSB) consisting of a primary synchronization signal (PSS) of the first cell, a secondary synchronization signal (SSS) of the first cell, and a physical broadcast channel (PBCH) of the first cell.

In each aspect of the present disclosure, the method for the UE or the operations of the UE, processing device, or storage medium may include: detecting a group-common downlink control information (DCI) format related to the transition to the second mode; and transitioning from the first mode to the second mode based on the group-common DCI format.

In each aspect of the present disclosure, the method for the UE or the operations of the UE, processing device, or storage medium may further include transmitting an acknowledgment (ACK) or a negative ACK (NACK) for the transition to the second mode based on the group-common DCI format.

In each aspect of the present disclosure, the method for the UE or the operations of the UE, processing device, or storage medium may include: receiving a configuration related to a third mode, wherein the configuration related to the third mode includes information regarding a time period for the third mode: monitoring a physical downlink control channel (PDCCH) for system information block 1 (SIB1) of the first cell on the first cell within a second time period, based on transition from the first mode to the third mode: transmitting an S1B1 request on a random access channel (RACH) resource related to the SIB1 PDCCH, based on detection of an SIB1 PDCCH for the SIB1; and receiving a physical downlink shared channel (PDSCH) carrying the SIB1, based on the transmission of the SIB1 request.

In each aspect of the present disclosure, the method for the BS or the operations of the BS may further include transmitting a group-common DCI format related to the transition to the second mode.

In each aspect of the present disclosure, the method for the BS or the operations of the BS may include transitioning from the first mode to the second mode based on the transmission of the group-common DCI format.

In each aspect of the present disclosure, the method for the BS or the operations of the BS may further include receiving an ACK or a NACK for the transition to the second mode based on the group-common DCI format.

In each aspect of the present disclosure, the method for the BS or the operations of the BS may include: transmitting a configuration related to a third mode related for the first cell, wherein the configuration related to the third mode includes information regarding a time period for the third mode; transmitting a PDCCH for SIB1 of the first cell on the first cell within a second time period, based on transition from the first mode to the third mode; and transmitting a PDSCH carrying the SIB1, based on reception of an S1B1 request on a RACH resource related to the PDCCH for the SIB1.

In each aspect of the present disclosure, the information regarding the time period for the second mode may include configurations for a plurality of time periods. The group-common DCI format may include information regarding the first time period among the plurality of time periods.

The foregoing solutions are merely a part of the examples of the present disclosure and various examples into which the technical features of the present disclosure are incorporated may be derived and understood by persons skilled in the art from the following detailed description.

According to implementation(s) of the present disclosure, energy saving methods and procedures for a network, base station (BS), and/or user equipment (UE) may be provided.

According to implementation(s) of the present disclosure, methods and procedures for transmitting a downlink signal may be provided to enable energy saving for a network, BS, and/or UE.

According to implementation(s) of the present disclosure, methods and procedures for transmitting minimum system information may be provided to enable energy saving for a network, BS, and/or UE.

The effects according to the present disclosure are not limited to what has been particularly described hereinabove and other effects not described herein will be more clearly understood by persons skilled in the art related to the present disclosure from the following detailed description.

BRIEF DESCRIPTION OF THE DRAWINGS

The accompanying drawings, which are included to provide a further understanding of the present disclosure, illustrate examples of implementations of the present disclosure and together with the detailed description serve to explain implementations of the present disclosure:

FIG. 10 illustrates SSB and CORESET multiplexing patterns:

FIG. 11 illustrates a discontinuous reception (DRX) operation applicable to implementation(s) of the present disclosure;

FIG. 14 illustrates a flow of transmission or reception of a common signal/channel according to some implementations of the present disclosure:

FIG. 15 illustrates common signal/channel occasions of cells according to some implementations of the present disclosure;

DETAILED DESCRIPTION

Figure 1:
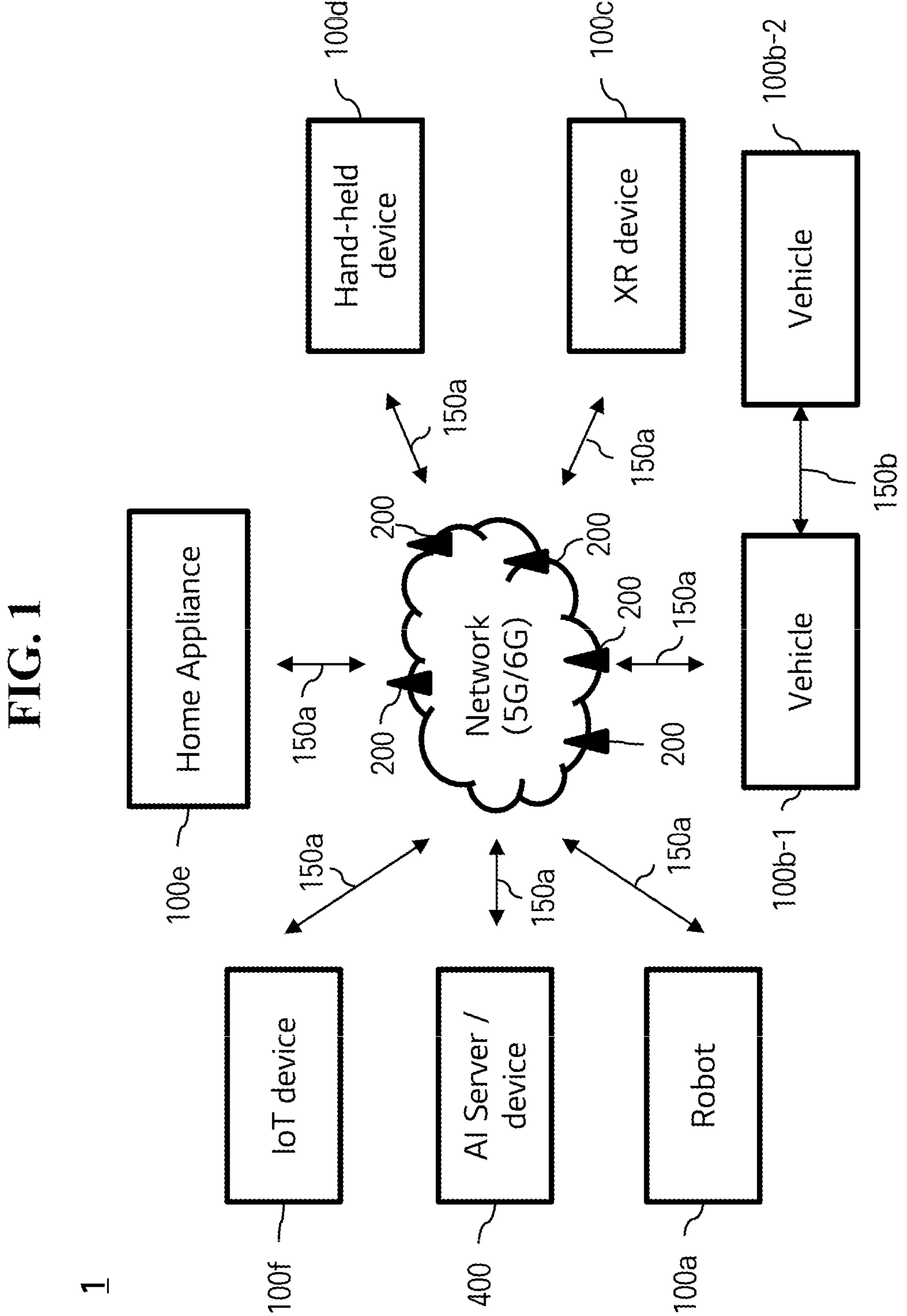
FIG. 1 illustrates an example of a communication system 1 to which implementations of the present disclosure are applied.

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details.

In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

A technique, a device, and a system described below may be applied to a variety of wireless multiple access systems. The multiple access systems may include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, a multi-carrier frequency division multiple access (MC-FDMA) system, etc. CDMA may be implemented by radio technology such as universal terrestrial radio access (UTRA) or CDMA2000. TDMA may be implemented by radio technology such as global system for mobile communications (GSM), general packet radio service (GPRS), enhanced data rates for GSM evolution (EDGE) (i.e., GERAN), etc. OFDMA may be implemented by radio technology such as institute of electrical and electronics engineers (IEEE) 802.11 (Wi-Fi), IEEE 802.16 (WiMAX), IEEE 802.20, evolved-UTRA (E-UTRA), etc. UTRA is part of universal mobile telecommunications system (UMTS) and 3rd generation partnership project (3GPP) long-term evolution (LTE) is part of E-UMTS using E-UTRA. 3GPP LTE adopts OFDMA on downlink (DL) and adopts SC-FDMA on uplink (UL). LTE-advanced (LTE-A) is an evolved version of 3GPP LTE.

For convenience of description, description will be given under the assumption that the present disclosure is applied to LTE and/or new RAT (NR). However, the technical features of the present disclosure are not limited thereto. For example, although the following detailed description is given based on mobile communication systems corresponding to 3GPP LTE/NR systems, the mobile communication systems are applicable to other arbitrary mobile communication systems except for matters that are specific to the 3GPP LTE/NR system.

For terms and techniques that are not described in detail among terms and techniques used in the present disclosure, reference may be made to 3GPP based standard specifications, for example, 3GPP TS 36.211, 3GPP TS 36.212, 3GPP TS 36.213, 3GPP TS 36.321, 3GPP TS 36.300, 3GPP TS 36.331, 3GPP TS 37.213, 3GPP TS 38.211, 3GPP TS 38.212, 3GPP TS 38.213, 3GPP TS 38.214, 3GPP TS 38.300, 3GPP TS 38.304, 3GPP TS 38.331, etc.

In examples of the present disclosure described later, if a device "assumes" something, this may mean that a channel transmission entity transmits a channel in compliance with the corresponding "assumption". This also may mean that a channel reception entity receives or decodes the channel in the form of conforming to the "assumption" on the premise that the channel has been transmitted in compliance with the "assumption".

In the present disclosure, a user equipment (UE) may be fixed or mobile. Each of various devices that transmit and/or receive user data and/or control information by communicating with a base station (BS) may be the UE. The term UE may be referred to as terminal equipment, mobile station (MS), mobile terminal (MT), user terminal (UT), subscriber station (SS), wireless device, personal digital assistant (PDA), wireless modem, handheld device, etc. In the present disclosure, a BS refers to a fixed station that communicates with a UE and/or another BS and exchanges data and control information with a UE and another BS. The term BS may be referred to as advanced base station (ABS), Node-B (NB), evolved Node-B (eNB), base transceiver system (BTS), access point (AP), processing server (PS), etc. Particularly, a BS of a universal terrestrial radio access (UTRAN) is referred to as an NB, a BS of an evolved-UTRAN (E-UTRAN) is referred to as an eNB, and a BS of new radio access technology network is referred to as a gNB. Hereinbelow, for convenience of description, the NB, eNB, or gNB will be referred to as a BS regardless of the type or version of communication technology.

In the present disclosure, a node refers to a fixed point capable of transmitting/receiving a radio signal to/from a UE by communication with the UE. Various types of BSs may be used as nodes regardless of the names thereof. For example, a BS, NB, eNB, pico-cell eNB (PeNB), home eNB (HeNB), relay, repeater, etc. may be a node. Furthermore, a node may not be a BS. For example, a radio remote head (RRH) or a radio remote unit (RRU) may be a node. Generally, the RRH and RRU have power levels lower than that of the BS. Since the RRH or RRU (hereinafter, RRH/RRU) is connected to the BS through a dedicated line such as an optical cable in general, cooperative communication according to the RRH/RRU and the BS may be smoothly performed relative to cooperative communication according to BSs connected through a wireless link. At least one antenna is installed per node. An antenna may refer to a physical antenna port or refer to a virtual antenna or an antenna group. The node may also be called a point.

In the present disclosure, a cell refers to a specific geographical area in which one or more nodes provide communication services. Accordingly, in the present disclosure, communication with a specific cell may mean communication with a BS or a node providing communication services to the specific cell. A DL/UL signal of the specific cell refers to a DL/UL signal from/to the BS or the node providing communication services to the specific cell. A cell providing UL/DL communication services to a UE is especially called a serving cell. Furthermore, channel status/quality of the specific cell refers to channel status/quality of a channel or a communication link generated between the BS or the node providing communication services to the specific cell and the UE. In 3GPP-based communication systems, the UE may measure a DL channel state from a specific node using cell-specific reference signal(s) (CRS(s)) transmitted on a CRS resource and/or channel state information reference signal(s) (CSI-RS(s)) transmitted on a CSI-RS resource, allocated to the specific node by antenna port(s) of the specific node.

A 3GPP-based communication system uses the concept of a cell in order to manage radio resources, and a cell related with the radio resources is distinguished from a cell of a geographic area.

The "cell" of the geographic area may be understood as coverage within which a node may provide services using a carrier, and the "cell" of the radio resources is associated with bandwidth (BW), which is a frequency range configured by the carrier. Since DL coverage, which is a range within which the node is capable of transmitting a valid signal, and UL coverage, which is a range within which the node is capable of receiving the valid signal from the UE, depend upon a carrier carrying the signal, coverage of the node may also be associated with coverage of the "cell" of radio resources used by the node. Accordingly, the term "cell" may be used to indicate service coverage by the node sometimes, radio resources at other times, or a range that a signal using the radio resources may reach with valid strength at other times.

In 3GPP communication standards, the concept of the cell is used in order to manage radio resources. The "cell" associated with the radio resources is defined by a combination of DL resources and UL resources, that is, a combination of a DL component carrier (CC) and a UL CC. The cell may be configured by the DL resources only or by the combination of the DL resources and the UL resources. If carrier aggregation is supported, linkage between a carrier frequency of the DL resources (or DL CC) and a carrier frequency of the UL resources (or UL CC) may be indicated by system information. For example, the combination of the DL resources and the UL resources may be indicated by system information block type 2 (SIB2) linkage. In this case, the carrier frequency may be equal to or different from a center frequency of each cell or CC. When carrier aggregation (CA) is configured, the UE has only one radio resource control (RRC) connection with a network. During RRC connection establishment/re-establishment/handover, one serving cell provides non-access stratum (NAS) mobility information. During RRC connection re-establishment/handover, one serving cell provides security input. This cell is referred to as a primary cell (Pcell). The Pcell refers to a cell operating on a primary frequency on which the UE performs an initial connection establishment procedure or initiates a connection re-establishment procedure. According to UE capability, secondary cells (Scells) may be configured to form a set of serving cells together with the Pcell. The Scell may be configured after completion of RRC connection establishment and used to provide additional radio resources in addition to resources of a specific cell (SpCell). A carrier corresponding to the Pcell on DL is referred to as a downlink primary CC (DL PCC), and a carrier corresponding to the Pcell on UL is referred to as an uplink primary CC (UL PCC). A carrier corresponding to the Scell on DL is referred to as a downlink secondary CC (DL SCC), and a carrier corresponding to the Scell on UL is referred to as an uplink secondary CC (UL SCC).

In a dual connectivity (DC) operation, the term special cell (SpCell) refers to a Pcell of a master cell group (MCG) or a primary secondary cell (PSCell) of a secondary cell group (SCG). The SpCell supports PUCCH transmission and contention-based random access and is always activated. The MCG is a group of service cells associated with a master node (e.g., BS) and includes the SpCell (Pcell) and optionally one or more Scells. For a UE configured with DC, the SCG is a subset of serving cells associated with a secondary node and includes the PSCell and 0 or more Scells. The PSCell is a primary Scell of the SCG. For a UE in RRC_CONNECTED state, that is not configured with CA or DC, only one serving cell including only the Pcell is present. For a UE in RRC_CONNECTED state, that is configured with CA or DC, the term serving cells refers to a set of cells including SpCell(s) and all Scell(s). In DC, two medium access control (MAC) entities, i.e., one MAC entity for the MCG and one MAC entity for the SCG, are configured for the UE.

For a UE that is configured with CA and is not configured with DC, a Pcell PUCCH group (also called a primary PUCCH group) including the Pcell and 0 or more Scells and an Scell PUCCH group (also called a secondary PUCCH group) including only Scell(s) may be configured. For the Scell, an Scell on which a PUCCH associated with the corresponding cell is transmitted (hereinafter, a PUCCH Scell) may be configured. An Scell for which a PUCCH Scell is indicated belongs to the Scell PUCCH group (i.e., the secondary PUCCH group) and PUCCH transmission of related uplink control information (UCI) is performed on the PUCCH Scell. If a PUCCH Scell is not indicated for an Scell or a cell which is indicated for PUCCH transmission for the Scell is a Pcell, the Scell belongs to the Pcell PUCCH group (i.e., the primary PUCCH group) and PUCCH transmission of related UCI is performed on the Pcell. Hereinbelow, if the UE is configured with the SCG and some implementations of the present disclosure related to a PUCCH are applied to the SCG, the primary cell may refer to the PSCell of the SCG. If the UE is configured with the PUCCH Scell and some implementations of the present disclosure related to the PUCCH are applied to the secondary PUCCH group, the primary cell may refer to the PUCCH Scell of the secondary PUCCH group.

In a wireless communication system, the UE receives information on DL from the BS and the UE transmits information on UL to the BS. The information that the BS and UE transmit and/or receive includes data and a variety of control information and there are various physical channels according to types/usage of the information that the UE and the BS transmit and/or receive.

The 3GPP-based communication standards define DL physical channels corresponding to resource elements carrying information originating from a higher layer and DL physical signals corresponding to resource elements which are used by the physical layer but do not carry the information originating from the higher layer. For example, a physical downlink shared channel (PDSCH), a physical broadcast channel (PBCH), a physical multicast channel (PMCH), a physical control format indicator channel (PCFICH), a physical downlink control channel (PDCCH), etc. are defined as the DL physical channels, and a reference signal (RS) and a synchronization signal are defined as the DL physical signals. The RS, which is also referred to as a pilot, represents a signal with a predefined special waveform known to both the BS and the UE. For example, a demodulation reference signal (DMRS), a channel state information RS (CSI-RS), a positioning reference signal (PRS) and etc. are defined as DL RSs. The 3GPP-based communication standards define UL physical channels corresponding to resource elements carrying information originating from the higher layer and UL physical signals corresponding to resource elements which are used by the physical layer but do not carry the information originating from the higher layer. For example, a physical uplink shared channel (PUSCH), a physical uplink control channel (PUCCH), and a physical random access channel (PRACH) are defined as the UL physical channels, and a DMRS for a UL control/data signal, a sounding reference signal (SRS) used for UL channel measurement, etc. are defined.

In the present disclosure, a PDCCH refers to a set of time-frequency resources (e.g., resource elements (REs)) carrying downlink control information (DCI), and a PDSCH refers to a set of time-frequency resources carrying DL data. A PUCCH, a PUSCH, and a PRACH refer to a set of time-frequency resources carrying UCI, a set of time-frequency resources carrying UL data, and a set of time-frequency resources carrying random access signals, respectively. In the following description, "the UE transmits/receives a PUCCH/PUSCH/PRACH" is used as the same meaning that the UE transmits/receives the UCI/UL data/random access signals on or through the PUCCH/PUSCH/PRACH, respectively. In addition, "the BS transmits/receives a PBCH/PDCCH/PDSCH" is used as the same meaning that the BS transmits the broadcast information/DCI/DL data on or through a PBCH/PDCCH/PDSCH, respectively.

In this specification, a radio resource (e.g., a time-frequency resource) scheduled or configured to the UE by the BS for transmission or reception of the PUCCH/PUSCH/PDSCH may be referred to as a PUCCH/PUSCH/PDSCH resource.

Since a communication device receives a synchronization signal (SS), DMRS, CSI-RS, PRS, PBCH, PDCCH, PDSCH, PUSCH, and/or PUCCH in the form of radio signals on a cell, the communication device may not select and receive radio signals including only a specific physical channel or a specific physical signal through a radio frequency (RF) receiver, or may not select and receive radio signals without a specific physical channel or a specific physical signal through the RF receiver. In actual operations, the communication device receives radio signals on the cell via the RF receiver, converts the radio signals, which are RF band signals, into baseband signals, and then decodes physical signals and/or physical channels in the baseband signals using one or more processors. Thus, in some implementations of the present disclosure, not receiving physical signals and/or physical channels may mean that a communication device does not attempt to restore the physical signals and/or physical channels from radio signals, for example, does not attempt to decode the physical signals and/or physical channels, rather than that the communication device does not actually receive the radio signals including the corresponding physical signals and/or physical channels.

As more and more communication devices have required greater communication capacity, there has been a need for eMBB communication relative to legacy radio access technology (RAT). In addition, massive MTC for providing various services at anytime and anywhere by connecting a plurality of devices and objects to each other is one main issue to be considered in next-generation communication. Further, communication system design considering services/UEs sensitive to reliability and latency is also under discussion. The introduction of next-generation RAT is being discussed in consideration of eMBB communication, massive MTC, ultra-reliable and low-latency communication (URLLC), and the like. Currently, in 3GPP, a study on the next-generation mobile communication systems after EPC is being conducted. In the present disclosure, for convenience, the corresponding technology is referred to a new RAT (NR) or fifth-generation (5G) RAT, and a system using NR or supporting NR is referred to as an NR system.

FIG. 1 illustrates an example of a communication system 1 to which implementations of the present disclosure are applied. Referring to FIG. 1, the communication system 1 applied to the present disclosure includes wireless devices, BSs, and a network. Here, the wireless devices represent devices performing communication using RAT (e.g., 5G NR or LTE (e.g., E-UTRA)) and may be referred to as communication/radio/5G devices. The wireless devices may include, without being limited to, a robot 100*a*, vehicles 100*b*-1 and 100*b*-2, an extended reality (XR) device 100*c*, a hand-held device 100*d*, a home appliance 100*e*, an Internet of Things (IoT) device 100*f*, and an artificial intelligence (AI) device/server 400. For example, the vehicles may include a vehicle having a wireless communication function, an autonomous driving vehicle, and a vehicle capable of performing vehicle-to-vehicle communication. Here, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may also be implemented as wireless devices and a specific wireless may operate as a BS/network node with respect to another wireless device.

The wireless devices 100*a* to 100*f* may be connected to a network 300 via BSs 200. AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR)

network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. vehicle-to-vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a* and 150*b* may be established between the wireless devices 100*a* to 100*f* and the BSs 200 and between the wireless devices 100*a* to 100*f*). Here, the wireless communication/connections such as UL/DL communication 150*a* and sidelink communication 150*b* (or, device-to-device (D2D) communication) may be established by various RATs (e.g., 5G NR). The wireless devices and the BSs/wireless devices may transmit/receive radio signals to/from each other through the wireless communication/connections 150*a* and 150*b*. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 2:
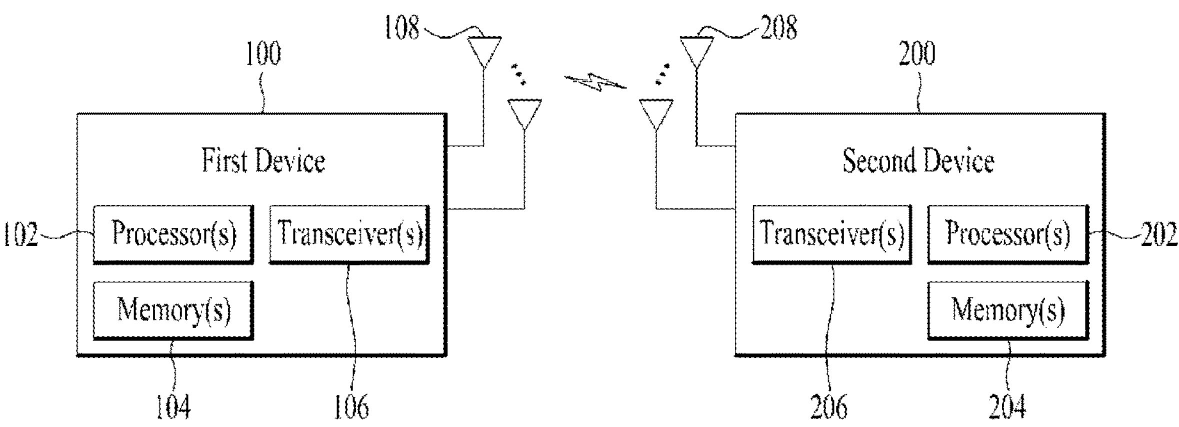
FIG. 2 is a block diagram illustrating examples of communication devices capable of performing a method according to the present disclosure.

FIG. 2 is a block diagram illustrating examples of communication devices capable of performing a method according to the present disclosure. Referring to FIG. 2, a first wireless device 100 and a second wireless device 200 may transmit and/or receive radio signals through a variety of RATs (e.g., LTE and NR). Here, {the first wireless device 100 and the second wireless device 200} may correspond to {the wireless device 100*x* and the BS 200} and/or {the wireless device 100*x* and the wireless device 100*x*} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the below-described/proposed functions, procedures, and/or methods. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or all of processes controlled by the processor(s) 102 or store software code including instructions for performing the below-described/proposed procedures and/or methods. Here, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 is used interchangeably with radio frequency (RF) unit(s). In the present disclosure, the wireless device may represent the communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the below-described/proposed functions, procedures, and/or methods. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may perform a part or all of processes controlled by the processor(s) 202 or store software code including instructions for performing the below-described/proposed procedures and/or methods. Here, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 is used interchangeably with RF unit(s). In the present disclosure, the wireless device may represent the communication modem/circuit/chip.

The wireless communication technology implemented in the wireless devices 100 and 200 of the present disclosure may include narrowband Internet of things for low-power communication as well as LTE, NR, and 6G. For example, the NB-IoT technology may be an example of low-power wide-area network (LPWAN) technologies and implemented in standards such as LTE Cat NB1 and/or LTE Cat NB2. However, the NB-IoT technology is not limited to the above names. Additionally or alternatively, the wireless communication technology implemented in the wireless devices XXX and YYY of the present disclosure may perform communication based on the LTE-M technology. For example, the LTE-M technology may be an example of LPWAN technologies and called by various names including enhanced machine type communication (eMTC). For example, the LTE-M technology may be implemented in at least one of the following various standards: 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, etc., but the LTE-M technology is not limited to the above names. Additionally or alternatively, the wireless communication technology implemented in the wireless devices XXX and YYY of the present disclosure may include at least one of ZigBee, Bluetooth, and LPWAN in consideration of low-power communication, but the wireless communication technology is not limited to the above names. For example, the ZigBee technology may create a personal area network (PAN) related to small/low-power digital communication based on various standards such as IEEE 802.15.4 and so on, and the ZigBee technology may be called by various names.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as a physical (PHY) layer, medium access control (MAC) layer, a radio link control (RLC) layer, a packet data convergence protocol (PDCP) layer, radio resource control (RRC) layer, and a service data adaptation protocol (SDAP) layer). The one or more processors 102 and 202 may generate one or more protocol data units (PDUs) and/or one or more service data units (SDUs) according to the functions, procedures, proposals, and/or methods disclosed in the present disclosure. The one or more processors 102 and 202 may generate messages, control information, data, or information according to the functions, procedures, proposals, and/or methods disclosed in the present disclosure. The one or more processors 102 and 202 may generate signals (e.g., baseband signals) including PDUs, SDUs, messages, control information, data, or information according to the functions, procedures, proposals, and/or methods disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The functions, procedures, proposals, and/or methods disclosed in the present disclosure may be implemented using firmware or software, and the firmware or software may be configured to include the modules, procedures, or functions. Firmware or software configured to perform the functions, procedures, proposals, and/or methods disclosed in the present disclosure may be included in the one or more processors 102 and 202 or stored in the one or more memories 104 and 204 so as to be driven by the one or more processors 102 and 202. The functions, procedures, proposals, and/or methods disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, commands, and/or instructions. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of the present disclosure, to one or more other devices. The one or more transceivers 106 and 206 may receive user data, control information, and/or radio signals/channels, mentioned in the functions, procedures, proposals, methods, and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the functions, procedures, proposals, methods, and/or operational flowcharts disclosed in the present disclosure, through the one or more antennas 108 and 208. In the present disclosure, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 3:
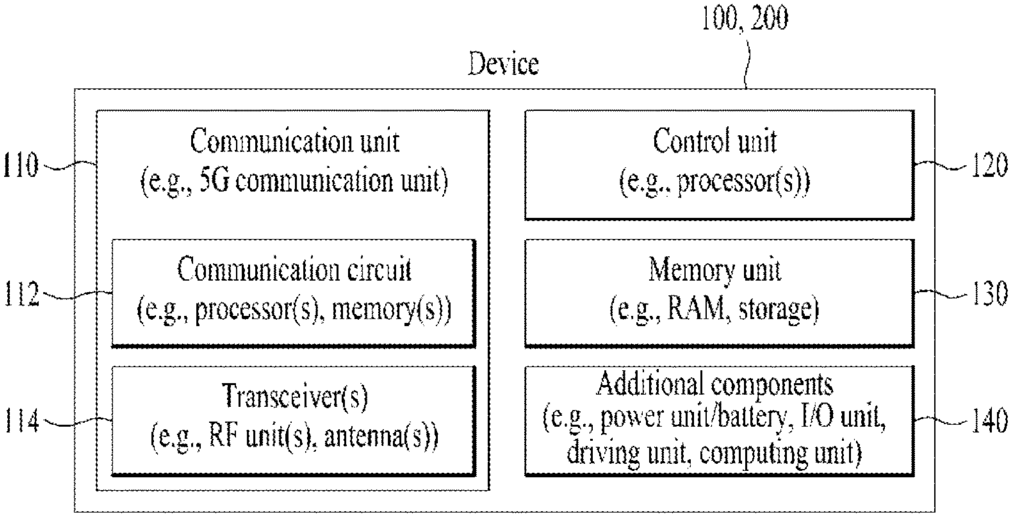
FIG. 3 illustrates another example of a wireless device capable of performing implementation(s) of the present disclosure.

FIG. 3 illustrates another example of a wireless device capable of performing implementation(s) of the present disclosure. Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast UE, a hologram device, a public safety device, an MTC device, a medicine device, a fintech device (or a finance device), a security device, a climate/environment device, the AI server/device (400 of FIG. 1), the BS (200 of FIG. 1), a network node, etc. The wireless device may be used in a mobile or fixed place according to a use-case/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read-only memory (ROM)), a flash memory, a volatile memory, a non-volatile memory, and/or a combination thereof.

In the present disclosure, the at least one memory (e.g., 104 or 204) may store instructions or programs, and the instructions or programs may cause, when executed, at least one processor operably connected to the at least one memory to perform operations according to some embodiments or implementations of the present disclosure.

In the present disclosure, a computer readable (non-transitory) storage medium may store at least one instruction or program, and the at least one instruction or program may cause, when executed by at least one processor, the at least one processor to perform operations according to some embodiments or implementations of the present disclosure.

In the present disclosure, a processing device or apparatus may include at least one processor, and at least one computer memory operably connected to the at least one processor. The at least one computer memory may store instructions or programs, and the instructions or programs may cause, when executed, the at least one processor operably connected to the at least one memory to perform operations according to some embodiments or implementations of the present disclosure.

In the present disclosure, a computer program may include program code stored on at least one computer-readable (non-volatile) storage medium and, when executed, configured to perform operations according to some implementations of the present disclosure or cause at least one processor to perform the operations according to some implementations of the present disclosure. The computer program may be provided in the form of a computer program product. The computer program product may include at least one computer-readable (non-volatile) storage medium.

A communication device of the present disclosure includes at least one processor; and at least one computer memory operably connected to the at least one processor and configured to store instructions for causing, when executed, the at least one processor to perform operations according to example(s) of the present disclosure described later.

Figure 4:
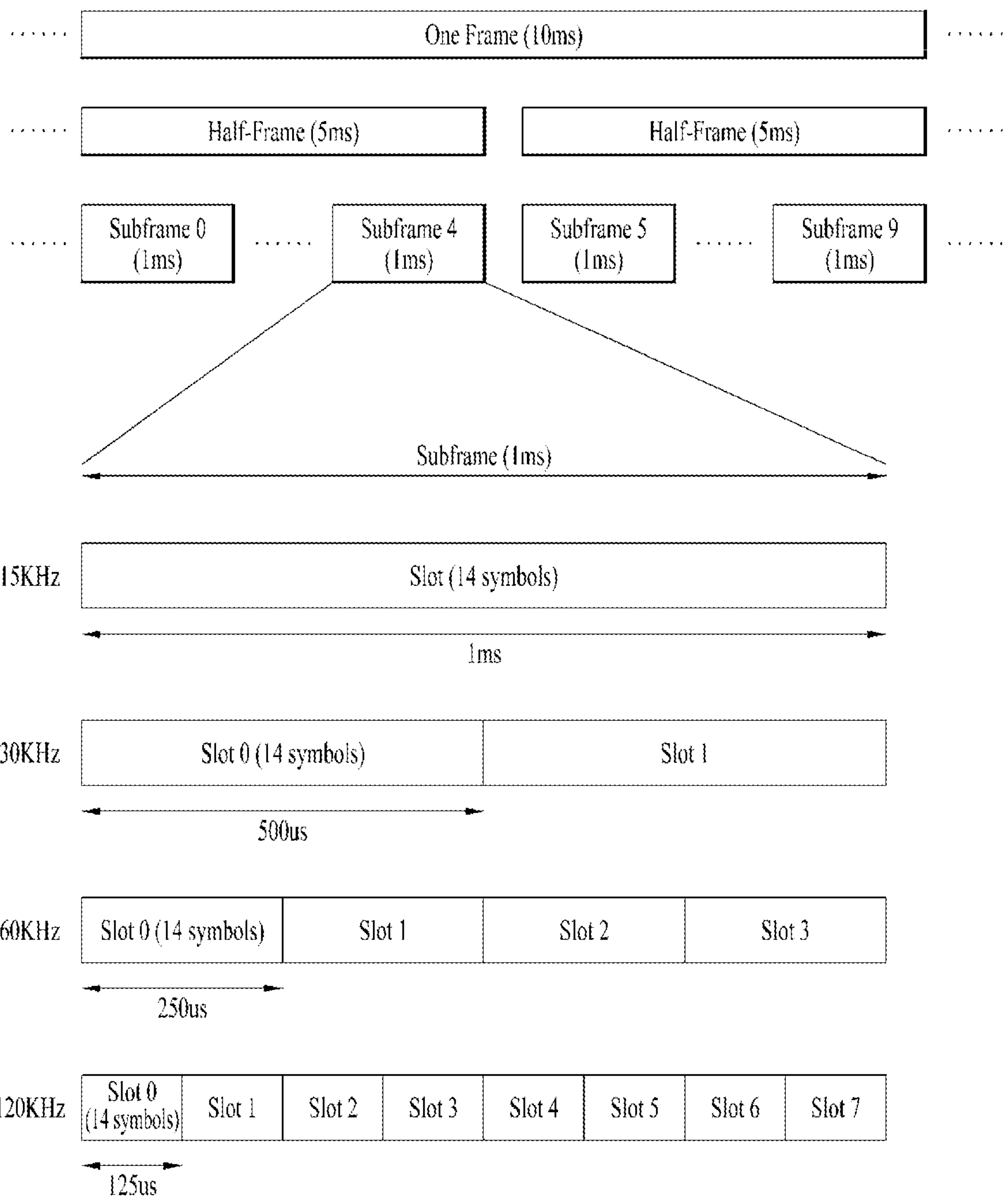
FIG. 4 illustrates an example of a frame structure used in a 3rd generation partnership project (3GPP)-based wireless communication system.

FIG. 4 illustrates an example of a frame structure used in a 3GPP-based wireless communication system.

The frame structure of FIG. 4 is purely exemplary and the number of subframes, the number of slots, and the number of symbols, in a frame, may be variously changed. In an NR system, different OFDM numerologies (e.g., subcarrier spacings (SCSs)) may be configured for multiple cells which are aggregated for one UE. Accordingly, the (absolute time) duration of a time resource including the same number of symbols (e.g., a subframe, a slot, or a transmission time interval (TTI)) may be differently configured for the aggregated cells. Here, the symbol may include an OFDM symbol (or cyclic prefix-OFDM (CP-OFDM) symbol) and an SC-FDMA symbol (or discrete Fourier transform-spread-OFDM (DFT-s-OFDM) symbol). In the present disclosure, the symbol, the OFDM-based symbol, the OFDM symbol, the CP-OFDM symbol, and the DFT-s-OFDM symbol are used interchangeably.

Referring to FIG. 4, in the NR system, UL and DL transmissions are organized into frames. Each frame has a duration of $T_f=(\Delta f_{max}*N_f/100)*T_c=10$ ms and is divided into two half-frames of 5 ms each. A basic time unit for NR is $T_c=1/(\Delta f_{max}*N_f)$ where $\Delta f_{max}=480*10^3$ Hz and $N_f=4096$. For reference, a basic time unit for LTE is $Ts=1/(\Delta f_{ref}*N_{f,ref})$ where $\Delta f_{ref}=15*10^3$ Hz and $N_{f,ref}=2048$. $T_c$ and $T^f$ have the relationship of a constant $k=T_c/T_f=64$. Each half-frame includes 5 subframes and a duration $T_{sf}$ of a single subframe is 1 ms. Subframes are further divided into slots and the number of slots in a subframe depends on a subcarrier spacing. Each slot includes 14 or 12 OFDM symbols based on a cyclic prefix. In a normal CP, each slot includes 14 OFDM symbols and, in an extended CP, each slot includes 12 OFDM symbols. The numerology depends on an exponentially scalable subcarrier spacing $\Delta f=2^u*15$ kHz. The table below shows the number of OFDM symbols ($N^{slot}_{symb}$) per slot, the number of slots ($N^{frame,u}_{slot}$) per frame, and the number of slots ($N^{subframe,u}_{slot}$) per subframe.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The table below shows the number of OFDM symbols per slot, the number of slots per frame, and the number of slots per subframe, according to the subcarrier spacing $\Delta f=2^u*15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

For a subcarrier spacing configuration u, slots may be indexed within a subframe in ascending order as follows: $n^u_s \in \{0, \ldots, n^{subframe,u}_{slot}-1\}$ and indexed within a frame in ascending order as follows: $n^u_{s,f} \in \{0, \ldots, n^{frame,u}_{slot}-1\}$.

Figure 5:
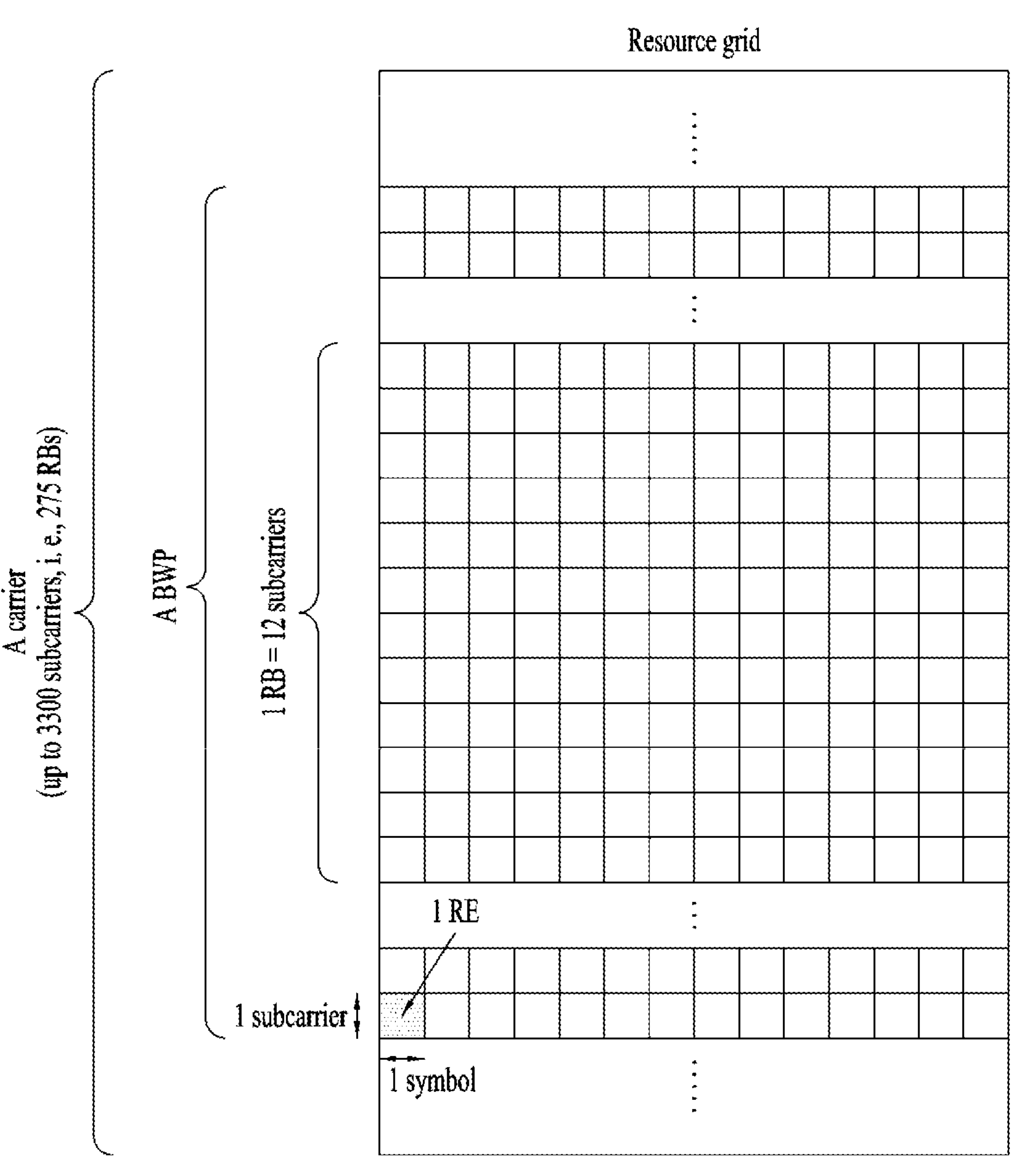
FIG. 5 illustrates a resource grid of a slot.

FIG. 5 illustrates a resource grid of a slot. The slot includes multiple (e.g., 14 or 12) symbols in the time domain. For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at a common resource block (CRB) $N^{start,u}_{grid}$ indicated by higher layer signaling (e.g. RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP-based wireless communication system, $N^{RB}_{sc}$ is typically 12. There is one resource grid for a given antenna port p, a subcarrier spacing configuration u, and a transmission link (DL or UL). The carrier bandwidth $N^{size,u}_{grid}$ for the subcarrier spacing configuration u is given to the UE by a higher layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index/representing a symbol location relative to a reference point in the time domain. In the NR system, an RB is defined by 12 consecutive subcarriers in the frequency domain. In the NR system, RBs are classified into CRBs and physical resource blocks (PRBs). The CRBs are numbered from 0 upwards in the frequency domain for the subcarrier spacing configuration u. The center of subcarrier 0 of CRB 0 for the subcarrier spacing configuration u is equal to ‘Point A’ which serves as a common reference point for RB grids. The PRBs for subcarrier spacing configuration u are defined within a bandwidth part (BWP) and numbered from 0 to $N^{size,u}_{BWP,i}-1$, where i is a number of the BWP. The relation between a PRB $n_{PRB}$ in a BWP i and a CRB $n^{u}_{CRB}$ is given by: $n^{u}_{PRB}=n^{u}_{CRB}+N^{size,u}_{BWP,i}$, Where $N^{size}_{BWP,i}$ is a CRB in which the BWP starts relative to CRB 0. The BWP includes a plurality of consecutive RBs in the frequency domain. For example, the BWP may be a subset of contiguous CRBs defined for a given numerology $u_i$ in the BWP i on a given carrier. A carrier may include a maximum of N (e.g., 5) BWPs. The UE may be configured to have one or more BWPs on a given component carrier. Data communication is performed through an activated BWP and only a predetermined number of BWPs (e.g., one BWP) among BWPs configured for the UE may be active on the component carrier.

For each serving cell in a set of DL BWPs or UL BWPs, the network may configure at least an initial DL BWP and one (if the serving cell is configured with uplink) or two (if supplementary uplink is used) initial UL BWPs. The network may configure additional UL and DL BWPs. For each DL BWP or UL BWP, the UE may be provided the following parameters for the serving cell: i) an SCS: ii) a CP: iii) a CRB $N^{start}_{BWP}=O_{carrier}+RB_{start}$ and the number of contiguous RBs $N^{size}_{BWP}=L_{RB}$ provided by an RRC parameter locationAndBandwidth, which indicates an offset $RB_{set}$ and a length $L_{RB}$ as a resource indicator value (RIV) on the assumption of $N^{start}_{BWP}=275$, and a value $O_{carrier}$ provided by an RRC parameter offsetToCarrier for the SCS: an index in the set of DL BWPs or UL BWPs: a set of BWP-common parameters; and a set of BWP-dedicated parameters.

Virtual resource blocks (VRBs) may be defined within the BWP and indexed from 0 to $N^{size,u}_{BWP,i}-1$, where i denotes a BWP number. The VRBs may be mapped to PRBs according to interleaved mapping or non-interleaved mapping. In some implementations, VRB n may be mapped to PRB n for non-interleaved VRB-to-PRB mapping.

NR frequency bands are defined as two types of frequency ranges, i.e., FR1 and FR2. FR2 is also referred to as millimeter wave (mmW). The following table shows frequency ranges within which NR may operate.

TABLE 3

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 6:
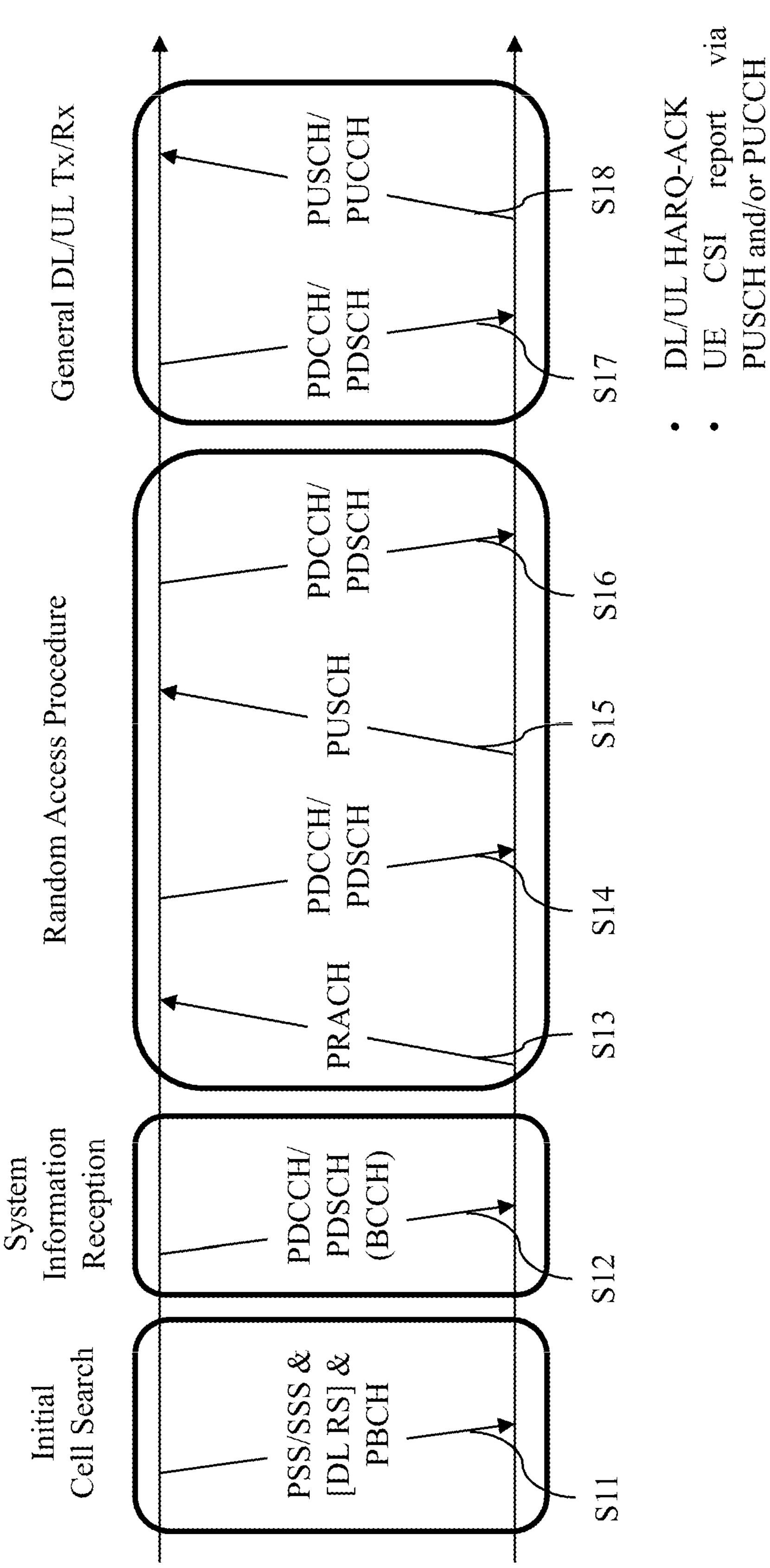
FIG. 6 illustrates physical channels and a signal transmission/reception procedure using the physical channels in a 3rd generation partnership project based (3GPP-based) communication system as an exemplary wireless communication system.

FIG. 6 is a diagram illustrating physical channels and a signal transmission/reception procedure using the physical channels in a 3GPP-based communication system as an exemplary wireless communication system.

When the UE is powered on or when the UE has been disconnected from the wireless communication system, the UE searches for a cell to camp on and performs initial cell search involving synchronization with a BS in the cell (S11). For the initial cell search, the UE receives a synchronization signal block (SSB) (also referred to as a SSB/PBCH block) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may camp on the cell. Subsequently, the UE may monitor a PDCCH in the cell and acquire more specific system information by receiving a PDSCH based on DCI carried on the PDCCH (S12).

Subsequently, to complete connection to the BS, the UE may perform a random access procedure (S13 to S16). In the random access procedure, for example, the UE may transmit a preamble on a PRACH (S13) and receive a PDCCH and a random access response (RAR) for the preamble on a PDSCH corresponding to the PDCCH (S14). When the UE fails in receiving the RAR directed to the UE, the UE may attempt to retransmit the preamble. In the case of contention-based random access, the UE may transmit a PUSCH based on a UL resource assignment included in the RAR (S15), and perform a contention resolution procedure including reception of a PDCCH and a PDSCH corresponding to the PDCCH (S16).

After the above procedure, the UE may receive a PDCCH/PDSCH from the BS (S17) and transmit a PUSCH/PUCCH to the BS (S18) in a general UL/DL signal transmission procedure. Control information that the UE transmits to the BS is generically called uplink control information (UCI). The UCI includes a hybrid automatic repeat and request acknowledgement/negative acknowledgement (HARQ ACK/NACK), a scheduling request (SR), and channel state information (CSI). The CSI includes a channel quality indicator (CQI), a precoding matrix indicator (PMI), and/or a rank indication (RI). In general, UCI is transmitted on the PUCCH. However, when control information and data should be transmitted simultaneously, the control information may be transmitted on the PUSCH. In addition, the UE may transmit the UCI aperiodically on the PUSCH, upon receipt of a request/command from a network.

Figure 7:
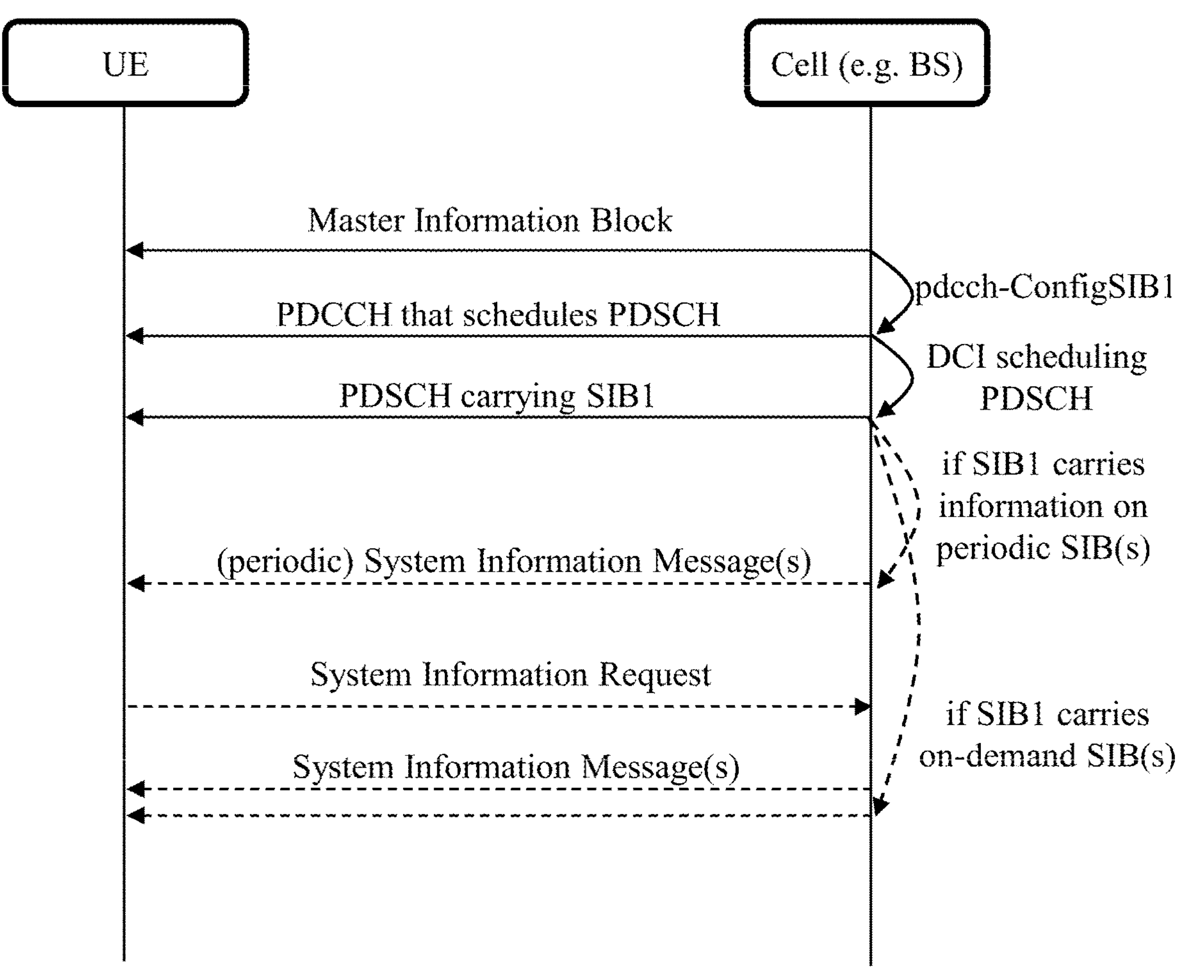
FIG. 7 illustrates a system information (SI) acquisition procedure.

FIG. 7 illustrates a system information (SI) acquisition procedure. The UE may acquire access stratum/non-access stratum (AS/NAS) information from the SI acquisition procedure. The SI acquisition procedure may be applied to UEs in the following states: RRC_IDLE, RRC_INACTIVE, and RRC_CONNECTED. RRC_CONNECTED refers to a state in which the UE has established an RRC connection with the network. RRC_IDLE refers to a state in which the UE is not registered in a specific cell and does not receive AS context and other information from the network. RRC_INACTIVE refers to a state in which the UE remains in a state called CM-CONNECTED where the UE has a signaling connection with the core network for connection management (CM) and is capable of moving within an area defined by the radio access network (RAN) (e.g., BS(s)) without notifying the RAN. CM_CONNECTED refers to a state in which the UE has a NAS signaling connection with the core network. CM IDLE refers to a state in which the UE has no NAS signaling connection.

In the 3GPP based system, system information (SI) may be classified into a master information block (MIB) and a plurality of system information blocks (SIBs). MIB and a plurality of SIBs are divided into minimum system information (SI) and other SI, where the minimum SI is comprised of MIB and SystemInformationBlock1 (SIB1) and comprises basic information required for initial access and information for acquiring any other SI. SIB1 may be referred to as remaining minimum system information (RMSI). The details may be found in the following.

The MIB is always transmitted on the BCH with a periodicity of 80 ms and repetitions made within 80 ms. The MIB includes information/parameters related to SIB1 reception and is transmitted through the PBCH in the SSB. During initial cell selection, the UE assumes that a half-frame including SSB(s) is repeated with a periodicity of 20 ms. The UE may determine based on the MIB whether there is a control resource set (CORESET) for a Type0-PDCCH common search space. The Type0-PDCCH common search space is a kind of PDCCH search space and used to transmit a PDCCH that schedules an SI message. When the Type0-PDCCH common search space exists, the UE may determine based on information in the MIB (e.g., pdcch-ConfigSIB1) (i) a plurality of consecutive RBs and one or more consecutive symbols included in a CORESET and (ii) a PDCCH occasion (i.e., a time-domain position for PDCCH reception). When there is no Type0-PDCCH common search space, pdcch-ConfigSIB1 provides information regarding a frequency position where the SSB/SIB1 exists and information regarding a frequency range where the SSB/SIB1 does not exist.

The SIB1 is transmitted on the downlink shared channel (DL-SCH) with a periodicity of 160 ms and variable transmission repetition periodicity within 160 ms. The default transmission repetition periodicity of SIB1 is 20 ms but the actual transmission repetition periodicity is up to network implementation. SIB1 includes information regarding availability and scheduling (e.g., transmission periodicity and SI-window size) of the remaining SIBs (hereinafter referred to as SIBx, where x is an integer greater than and equal to 2). For example, SIB1 may indicate whether SIBx is periodically broadcast or provided at the request of the UE in an on-demand way. When SIBx is provided in an on-demand way, SIB1 may include information necessary for the UE to perform an SI request. SIB1 is a cell-specific SIB. A PDCCH that schedules SIB1 is transmitted in the Type0-PDCCH common search space, and SIB1 is transmitted through a PDSCH indicated by the PDCCH.

SIBx is included in the SI message and transmitted through the PDSCH. Each SI message is transmitted within a periodically occurring time window (i.e., SI-window).

Figure 8:
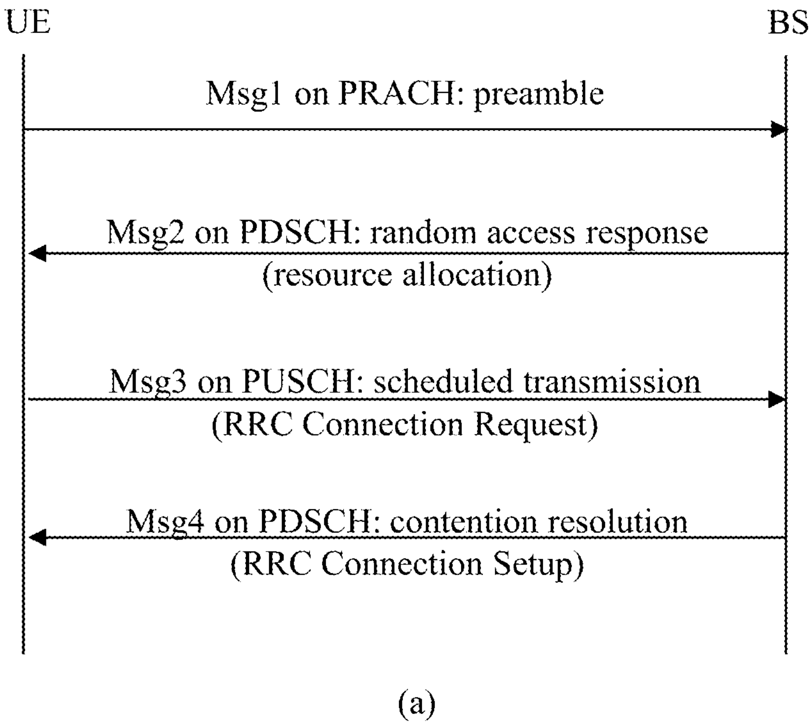
FIG. 8 illustrates random access procedures applicable to implementation(s) of the present disclosure.
Figure 8:
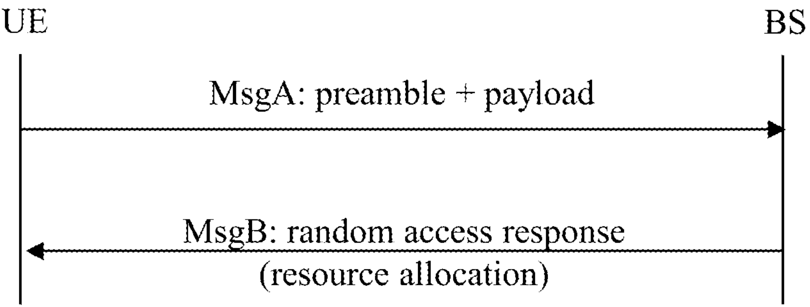

FIG. 8 illustrates random access procedures applicable to implementation(s) of the present disclosure. Particularly, FIG. 8(*a*) illustrates a 4-step random access procedure, and FIG. 8(*b*) illustrates a 2-step random access procedure.

A random access procedure may be used for various purposes including initial access, UL synchronization adjustment, resource allocation, handover, radio link reconfiguration after radio link failure, and positioning. Random access procedures are classified into a contention-based procedure and a dedicated (i.e., non-contention-based) procedure. The contention-based random access procedure generally involves initial access, whereas the dedicated random access procedure is used for UL synchronization reconfiguration in the event of handover, DL data arrival at a network, and positioning. In the contention-based random access procedure, the UE randomly selects a random access (RA) preamble. Accordingly, it is possible for a plurality of UEs to simultaneously transmit the same RA preamble, and thus a subsequent contention resolution process is required. In the dedicated random access procedure, the UE uses an RA preamble uniquely allocated to the UE by the BS. Therefore, the UE may perform the random access procedure without collision with other UEs.

Referring to FIG. 8(*a*), the contention-based random access procedure includes the following four steps. The messages transmitted in steps 1 to 4 may be referred to as message 1 (Msg1) to message 4 (Msg4), respectively.

Step 1: The UE transmits an RA preamble on a PRACH.

Step 2: The UE receives an RAR on a PDSCH from the BS.

Step 3: The UE transmits UL data on a PUSCH to the BS. The UL data includes a Layer 2 (L2)/Layer 3 (L3) message.

Step 4: The UE receives a contention resolution message on the PDSCH from the BS.

The UE may receive random access information in system information from the BS. For example, information regarding RACH occasions associated with SSBs on a cell may be provided in system information. The UE may select an SSB whose reference signal received power (RSRP), which is measured based on the SSB, exceeds a threshold from among SSBs received on the cell. Then, the UE may transmit an RA preamble on a PRACH associated with the selected SSB. For example, When the UE needs random access, the UE transmits Msg1 (e.g., a preamble) on a PRACH to the BS. The BS may identify each RA preamble by a time/frequency resource (RA occasion (RO)) carrying the RA preamble, and a preamble index (PI). Upon receipt of the RA preamble from the UE, the BS transmits an RAR message to the UE on a PDSCH. To receive the RAR message, the UE monitors an L1/L2 control channel (PDCCH) with a cyclic redundancy check (CRC) masked with a random access-RNTI (RA-RNTI), including scheduling information for the RAR message, within a preconfigured time window (e.g., ra-ResponseWindow). When receiving scheduling information on the PDCCH masked with the RA-RNTI, the UE may receive an RAR message on a PDSCH indicated by the scheduling information. The UE then checks whether there is an RAR directed to the UE in the RAR message. The presence or absence of the RAR directed to the UE may be determined by checking whether there is a random access preamble ID (RAPID) for the preamble transmitted by the UE. The index of the preamble transmitted by the UE may be identical to the RAPID. The RAR includes the index of the corresponding RA preamble, timing offset information (e.g., timing advance command (TAC)) for UL synchronization, UL scheduling information (e.g., UL grant) for Msg3 transmission, and UE temporary identification information (e.g., temporary-C-RNTI (TC-RNTI)). Upon receipt of the RAR, the UE transmits Msg3 on a PUSCH according to the UL scheduling information and the timing offset value in the RAR. Msg3 may include the ID (or global ID) of the UE. Further, Msg3 may include RRC connection request-related information (e.g., RRC-SetupRequest message) for initial access to the network. After receiving Msg3, the BS transmits a contention resolution message, that is, Msg4 to the UE. When the UE receives the contention resolution message and succeeds in contention resolution, the TC-RNTI is changed to a C-RNTI. Msg4 may include the ID of the UE/RRC connection-related information (e.g., an RRCSetup message). When information transmitted in Msg3 does not match information received in Msg4 or when the UE has not received Msg4 for a predetermined time, the UE may determine that the contention resolution has failed and retransmit Msg3.

The dedicated random access procedure includes the following three steps. Messages transmitted in step 0 to step 2 may be referred to as Msg0 to Msg2, respectively. The BS may trigger the dedicated random access procedure by a PDCCH serving the purpose of commanding RA preamble transmission (hereinafter, referred to as a PDCCH order).

Step 0: The BS allocates an RA preamble to the UE by dedicated signaling.

Step 1: The UE transmits the RA preamble on a PRACH.

Step 2: The UE receives an RAR on a PDSCH from the BS.

Step 1 and step 2 of the dedicated random access procedure may be the same as step 1 and step 2 of the contention-based random access procedure.

The NR system may require lower latency than the legacy system. Particularly for a latency-sensitive service such as URLLC, the 4-step random access procedure may not be preferable. A low-latency random access procedure may be needed for various scenarios in the NR system. When implementation(s) of the present disclosure are realized along with a random access procedure, the implementation(s) of the present disclosure may be carried out together with the following 2-step random access procedure to reduce latency involved in the random access procedure.

Referring to FIG. 8(*b*), the 2-step random access procedure may be performed in two steps: transmission of MsgA from the UE to the BS and transmission of MsgB from the BS to the UE. The MsgA transmission may include transmission of an RA preamble on a PRACH and transmission of UL payload on a PUSCH. In the MsgA transmission, the PRACH and the PUSCH may be transmitted in time division multiplexing (TDM). Alternatively, the PRACH and the PUSCH may be transmitted in frequency division multiplexing (FDM) in the MsgA transmission.

Upon receipt of MsgA, the BS may transmit MsgB to the UE. MsgB may include an RAR for the UE.

An RRC connection request-related message (e.g., RRC-SetupRequest message) requesting establishment of a connection between the RRC layer of the BS and the RRC layer of the UE may be included in the payload of MsgA. In this case, MsgB may be used to transmit RRC connection-related information (e.g., RRCSetup message). In contrast, the RRC connection request-related message (e.g., RRC-SetupRequest message) may be transmitted on a PUSCH based on a UL grant in MsgB. In this case, RRC connection-related information (e.g., RRCSetup message) related to the RRC connection request may be transmitted on a PDSCH associated with the PUSCH transmission after the PUSCH transmission based on MsgB.

Hereinafter, physical channels that may be used in the 3GPP-based wireless communication system will be described in detail.

A PDCCH carries DCI. For example, the PDCCH (i.e., DCI) carries information about transport format and resource allocation of a downlink shared channel (DL-SCH), information about resource allocation of an uplink shared channel (UL-SCH), paging information about a paging channel (PCH), system information about the DL-SCH, information about resource allocation for a control message, such as a random access response (RAR) transmitted on a PDSCH, of a layer (hereinafter, higher layer) positioned higher than a physical layer among protocol stacks of the UE/BS, a transmit power control command, information about activation/deactivation of configured scheduling (CS), etc. DCI including resource allocation information on the DL-SCH is called PDSCH scheduling DCI, and DCI including resource allocation information on the UL-SCH is called PUSCH scheduling DCI. The DCI includes a cyclic redundancy check (CRC). The CRC is masked/scrambled with various identifiers (e.g., radio network temporary identifier (RNTI)) according to an owner or usage of the PDCCH. For example, if the PDCCH is for a specific UE, the CRS is masked with a UE identifier (e.g., cell-RNTI (C-RNTI)). If the PDCCH is for a paging message, the CRC is masked with a paging RNTI (P-RNTI). If the PDCCH is for system information (e.g., system information block (SIB)), the CRC is masked with a system information RNTI (SI-RNTI). If the PDCCH is for a random access response, the CRC is masked with a random access-RNTI (RA-RNTI).

When a PDCCH on one serving cell schedules a PDSCH or a PUSCH on another serving cell, it is referred to cross-carrier scheduling. Cross-carrier scheduling with a carrier indicator field (CIF) may allow a PDCCH on a serving cell to schedule resources on another serving cell. When a PDSCH on a serving cell schedules a PDSCH or a PUSCH on the serving cell, it is referred to as self-carrier scheduling. When the cross-carrier scheduling is used in a cell, the BS may provide information about a cell scheduling the cell to the UE. For example, the BS may inform the UE whether a serving cell is scheduled by a PDCCH on another (scheduling) cell or scheduled by the serving cell. If the serving cell is scheduled by the other (scheduling) cell, the BS may inform the UE which cell signals DL assignments and UL grants for the serving cell. In the present disclosure, a cell carrying a PDCCH is referred to as a scheduling cell, and a cell where transmission of a PUSCH or a PDSCH is scheduled by DCI included in the PDCCH, that is, a cell carrying the PUSCH or PDSCH scheduled by the PDCCH is referred to as a scheduled cell.

A PDSCH is a physical layer UL channel for UL data transport. The PDSCH carries DL data (e.g., DL-SCH transport block) and is subjected to modulation such as quadrature phase shift keying (QPSK), 16 quadrature amplitude modulation (QAM), 64 QAM, 256 QAM, etc. A codeword is generated by encoding a transport block (TB). The PDSCH may carry a maximum of two codewords. Scrambling and modulation mapping per codeword may be performed and modulation symbols generated from each codeword may be mapped to one or more layers. Each layer is mapped to a radio resource together with a DMRS and generated as an OFDM symbol signal. Then, the OFDM symbol signal is transmitted through a corresponding antenna port.

Figure 9:
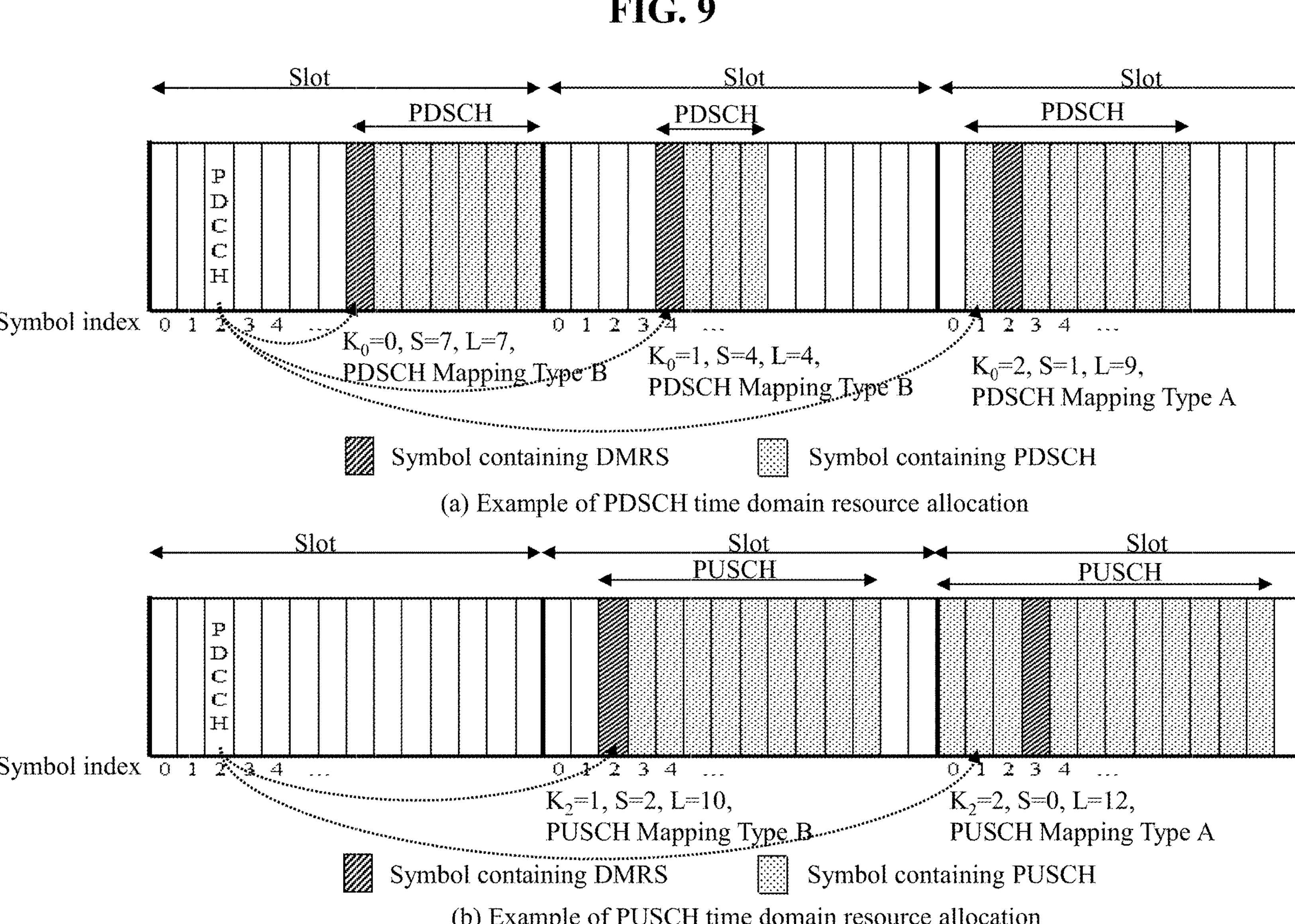
FIG. 9 illustrates an example of physical downlink shared channel (PDSCH) time domain resource assignment (TDRA) by a physical downlink control channel (PDCCH) and an example of physical uplink shared channel (PUSCH) TDRA by the PDCCH.

FIG. 9 illustrates an example of PDSCH TDRA caused by a PDCCH and an example of PUSCH TDRA caused by the PDCCH.

DCI carried by the PDCCH in order to schedule a PDSCH or a PUSCH includes a TDRA field. The TDRA field provides a value m for a row index m+1 to an allocation table for the PDSCH or the PUSCH. Predefined default PDSCH time domain allocation is applied as the allocation table for the PDSCH or a PDSCH TDRA table that the BS configures through RRC signaled pdsch-TimeDomainAllocationList is applied as the allocation table for the PDSCH. Predefined default PUSCH time domain allocation is applied as the allocation table for the PUSCH or a PUSCH TDRA table that the BS configures through RRC signaled pusch-TimeDomainAllocationList is applied as the allocation table for the PUSCH. The PDSCH TDRA table to be applied and/or the PUSCH TDRA table to be applied may be determined according a fixed/predefined rule (e.g., refer to 3GPP TS 38.214).

In PDSCH time domain resource configurations, each indexed row defines a DL assignment-to-PDSCH slot offset $K_0$, a start and length indicator SLIV (or directly, a start position (e.g., start symbol index S) and an allocation length (e.g., the number of symbols, L) of the PDSCH in a slot), and a PDSCH mapping type. In PUSCH time domain resource configurations, each indexed row defines a UL grant-to-PUSCH slot offset $K_2$, a start position (e.g., start symbol index S) and an allocation length (e.g., the number of symbols, L) of the PUSCH in a slot, and a PUSCH mapping type. $K_0$ for the PDSCH and $K_2$ for the PUSCH indicate the difference between the slot with the PDCCH and the slot with the PDSCH or PUSCH corresponding to the PDCCH. SLIV denotes a joint indicator of the start symbol S relative to the start of the slot with the PDSCH or PUSCH and the number of consecutive symbols, L, counting from the symbol S. There are two PDSCH/PUSCH mapping types: one is mapping type A and the other is mapping type B. In the case of PDSCH/PUSCH mapping type A, a DMRS is mapped to a PDSCH/PUSCH resource with respect to the start of a slot. One or two of the symbols of the PDSCH/PUSCH resource may be used as DMRS symbol(s) according to other DMRS parameters. For example, in the case of PDSCH/PUSCH mapping type A, the DMRS is located in the third symbol (symbol #2) or the fourth symbol (symbol #3) in the slot according to RRC signaling. In the case of PDSCH/PUSCH mapping type B, a DMRS is mapped with respect to the first OFDM symbol of a PDSCH/PUSCH resource. One or two symbols from the first symbol of the PDSCH/PUSCH resource may be used as DMRS symbol(s) according to other DMRS parameters. For example, in the case of PDSCH/PUSCH mapping type B, the DMRS is located at the first symbol allocated for the PDSCH/PUSCH. In the present disclosure, the PDSCH/PUSCH mapping type may be referred to as a mapping type or a DMRS mapping type. For example, in this specification, PUSCH mapping type A may be referred to as mapping type A or DMRS mapping type A, and PUSCH mapping type B may be referred to as mapping type B or DMRS mapping type B.

The scheduling DCI includes an FDRA field that provides assignment information about RBs used for the PDSCH or the PUSCH. For example, the FDRA field provides information about a cell for PDSCH or PUSCH transmission to the UE, information about a BWP for PDSCH or PUSCH transmission, and/or information about RBs for PDSCH or PUSCH transmission.

A CORESET, which is a set of time-frequency resources on which the UE is capable of monitoring a PDCCH, may be defined and/or configured. The UE may be configured with one or more CORESETs. The CORESET has a time duration of one to three OFDM symbols and includes a set of PRBs. The PRBs included in the CORESET and the CORESET duration may be provided to the UE through higher layer (e.g., RRC) signaling. The UE may monitor a set of PDCCH candidates in configured CORESET(s) according to corresponding search space sets. In the present disclosure, monitoring implies decoding (blind decoding) of each PDCCH candidate based on monitored DCI formats. The MIB on a PBCH provides the UE with parameters (e.g., CORESET #0 configuration) for monitoring a PDCCH that schedules a PDSCH carrying SIB1. The PBCH may indicate that there is no associated SIB1. In this case, the UE may be provided with not only a frequency range where the UE is allowed to assume that there is no SSB associated with SSB1 but also may be provided with another frequency range where the UE is allowed to discover an SSB associated with SIB1. CORESET #0, which is a CORESET for scheduling at least SIB1, may be configured through the MIB or dedicated RRC signaling.

The set of the PDCCH candidates that the UE monitors is defined in terms of PDCCH search space sets. The search space sets may be common search space (CSS) sets or UE-specific search space (USS) sets. Each CORESET configuration is associated with one or more search space sets and each search space set is associated with one CORESET configuration.

A UE monitors a set of PDCCH candidates in one or more CORESETs on the active DL BWP on each activated serving cell configured with PDCCH monitoring according to corresponding search space sets where monitoring implies receiving each PDCCH candidate and decoding according to the monitored DCI formats.

The following table shows PDCCH search spaces.

TABLE 4

| Search Space | Type | RNTI | Use Case |
|---|---|---|---|
| Type0-PDCCH | Common | SI-RNTI on a primary cell | Broadcast of System Information |
| Type0A-PDCCH | Common | SI-RNTI on a primary cell | Broadcast of System Information |
| Type1-PDCCH | Common | RA-RNTI or TC-RNTI on a primary cell | Msg2, Msg4 in RACH |
| Type2-PDCCH | Common | P-RNTI on a primary cell | Paging System Information change notification |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI or CS-RNTI | Group signaling |
| UE Specific | UE Specific | C-RNTI, MCS-C-RNTI or CS-RNTI | UE signaling (e.g., PDSCH/PUSCH) |

The SS set may be configured by system information (e.g., MIB) or UE-specific higher layer (e.g., RRC) signaling. S (e.g., 10) SS sets or less may be configured in each DL BWP of a serving cell. For example, the following parameters/information may be provided for each SS set. Each SS set may be associated with one CORESET, and each CORESET configuration may be associated with one or more SS sets.

- searchSpaceId: indicates the ID of the SS set.
- controlResourceSetId: indicates the CORESET associated with the SS set.
- monitoringSlotPeriodicity AndOffset: indicates a PDCCH monitoring periodicity (in a unit of slot) and a PDCCH monitoring offset (in a unit of slot).
- monitoringSymbolsWithinSlot: indicates first OFDMA symbol(s) for PDCCH monitoring in a slot in which the PDCCH monitoring is configured. The first OFDMA symbol(s) are indicated by a bitmap, and each bit corresponds to a respective one of OFDMA symbols in the slot. The MSB of the bitmap corresponds to the first OFDM symbol in the slot. OFDMA symbol(s) corresponding to bit(s) with a value of 1 corresponds to the first symbol(s) in the CORESET in the slot.
- nrofCandidates: indicates the number of PDCCH candidates (e.g., one of 0, 1, 2, 3, 4, 5, 6, and 8) for each AL (where AL= {1, 2, 4, 8, 16}).
- searchSpaceType: indicates whether the SS type is the CSS or USS.
- DCI format: indicates the DCI format of a PDCCH candidate.

The UE may monitor PDCCH candidates in one or more SS sets in a slot according to the configuration of the CORESET/SS set. An occasion (e.g., time/frequency resource) to monitor PDCCH candidates is defined as a PDCCH (monitoring) occasion. One or more PDCCH (monitoring) occasions may be configured within a slot.

Figures 10, 11:
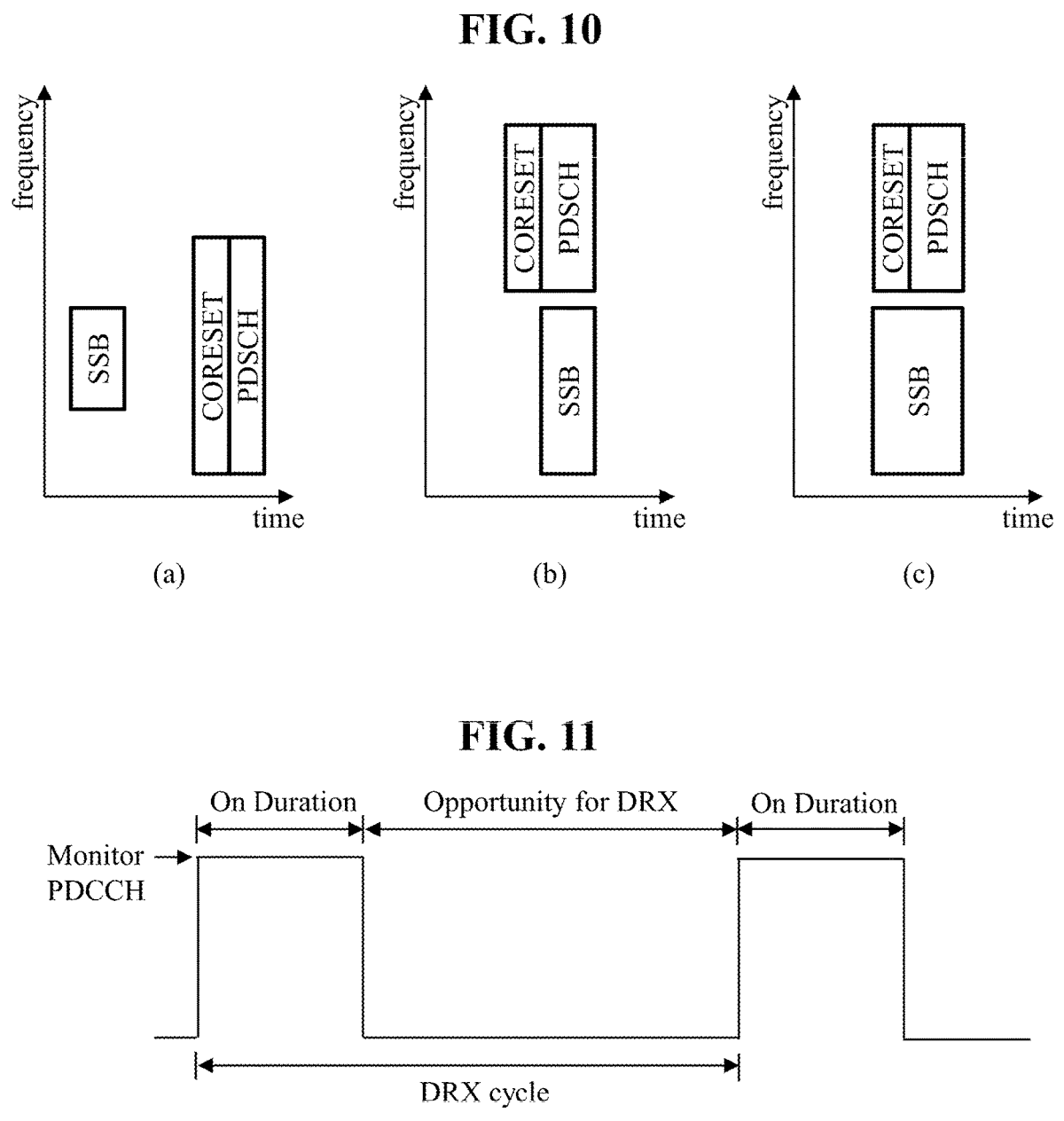

FIG. 10 illustrates SSB and CORESET multiplexing patterns. Specifically, FIG. 10(*a*) shows SSB and CORESET multiplexing pattern 1, FIG. 10(*b*) shows SSB and CORESET multiplexing pattern 2, and FIG. 10(*c*) shows SSB and CORESET multiplexing pattern 3. The SSB and CORSET multiplexing pattern may be predefined depending on the frequency range (FR) to which a corresponding cell belongs or the subcarrier spacing of an SSB or PDCCH.

As illustrated in FIG. 10, an SSB and CORESET may be multiplexed in the time domain, in the time and frequency domains, or in the frequency domain.

The set of the PDCCH candidates that the UE monitors is defined in terms of PDCCH search space sets. The search space sets may be common search space (CSS) sets or UE-specific search space (USS) sets. Each CORESET configuration is associated with one or more search space sets and each search space set is associated with one CORESET configuration.

A UE monitors a set of PDCCH candidates in one or more CORESETs on the active DL BWP on each activated serving cell configured with PDCCH monitoring according to corresponding search space sets where monitoring implies receiving each PDCCH candidate and decoding according to the monitored DCI formats.

FIG. 11 illustrates a discontinuous reception (DRX) operation. Specifically, FIG. 11 shows a DRX cycle for a UE in the RRC_CONNECTED state.

The UE may perform the DRX operation while executing the processes and/or methods according to implementation(s) of the present disclosure. DRX configurations/operations are defined in NR specifications (e.g., Rel-17). DRX, which is used to reduce unnecessary power consumption of the UE, has the following features. In DRX, a structure for the UE in the RRC_IDLE state (hereinafter referred to as I-DRX) and a structure for the UE in the RRC_CONNECTED state (hereinafter referred to as C-DRX) are defined separately. The two DRX structures are designed such that a period (e.g., active time period or on-duration period) in which the UE expects to receive a DL signal periodically occurs, thereby reducing unnecessary power consumption of the UE in other periods. In particular, in the case of C-DRX, the start position of the on-duration period is periodically defined according to NR Rel-16 specifications. In this case, the size (i.e., DRX cycle) of the configured period may be determined/configured through higher layer signaling such as RRC signaling provided by the BS to the UE.

Referring to FIG. 11, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, the UE may perform PDCCH monitoring/reception discontinuously in the time domain in the procedure and/or method according to implementation(s) of the present disclosure. For example, when DRX is configured, PDCCH reception occasions (e.g., slots with PDCCH search spaces) may be configured discontinuously according to a DRX configuration in the present disclosure. On the contrary, when DRX is not configured, the UE may perform PDCCH monitoring/reception continuously in the time domain. For example, when DRX is not configured, PDCCH reception occasions (e.g., slots with PDCCH search spaces) may be configured continuously in the present disclosure. Irrespective of whether DRX is configured, PDCCH monitoring may be restricted during a time period configured as a measurement gap. DRX configuration information is received through higher layer (e.g., RRC) signaling, and DRX ON/OFF is controlled by DRX commands from the MAC layer. Once DRX is configured, the UE may discontinuously perform PDCCH monitoring as shown in FIG. 8.

The following table describes a DRX operation of a UE. Referring to the following table, DRX configuration information is received by higher-layer signaling (e.g., RRC signaling), and DRX ON/OFF is controlled by a DRX command from the MAC layer. Once DRX is configured, the UE may perform PDCCH monitoring discontinuously, as illustrated in FIG. 11.

TABLE 5

| | Type of signals | UE procedure |
|---|---|---|
| 1st step | RRC signalling (MAC-CellGroupConfig) | Receive DRX configuration information |
| 2nd Step | MAC CE ((Long) DRX command MAC CE) | Receive DRX command |
| 3rd Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-onDurationTimer: configures the duration at the beginning of a DRX cycle.

Value of drx-SlotOffset: configures the delay before starting the drx-onDurationTimer.

Value of drx-InactivityTimer: the duration after the PDCCH occasion in which a PDCCH indicates a new UL or DL transmission for the MAC entity.

Value of drxRetransmissionTimerDL (per DL HARQ process except for the broadcast process): configures the maximum duration until a DL retransmission is received.

Value of drxRetransmissionTimerUL (per UL HARQ process): configures the maximum duration until a grant for UL retransmission is received.

Value of drx-HARQ-RTT-TimerDL (per DL HARQ process except for the broadcast process): configures the maximum duration from reception of initial DL transmission to reception of DL assignment for HARQ retransmission.

Value of drx-HARQ-RTT-TimerUL (per UL HARQ process): configures the maximum duration from reception of a grant for initial UL transmission to reception of a grant for UL retransmission.

drx-LongCycleStartOffset: configures the Long DRX cycle and drx-StartOffset which defines the subframe where the Long and Short DRX cycle starts.

drx-ShortCycle (optional): configures the Short DRX cycle.

drx-ShortCycleTimer (optional): configures the duration the UE shall follow the Short DRX cycle. For example, a value in multiples of the short DRX cycle may be configured by drx-CycleTimer. For example, the value of n may correspond to n*drx-ShortCycle.

The UE may perform PDCCH monitoring on serving cells within a DRX group if the DRX group is within the active time. In this case, the DRX group refers to a group of serving cells that are configured by RRC and have the same DRX active time. When DRX is configured, the Active Time for serving Cells in a DRX group includes the time while i) drx-onDurationTimer or drx-Inactivity Timer configured for the DRX group is running: or ii) drx-RetransmissionTimerDL or drx-RetransmissionTimerUL is running on any serving Cell in the DRX group: or ra-ContentionResoultionTimer or msgB-RsponseWindow is running: or a PDCCH indicating a new transmission addressed to the C-RNTI of a MAC entity of the UE has not been received after successful reception of a random access response for the Random Access Preamble not selected by the MAC entity among the contention-based random access preambles.

Figure 12:
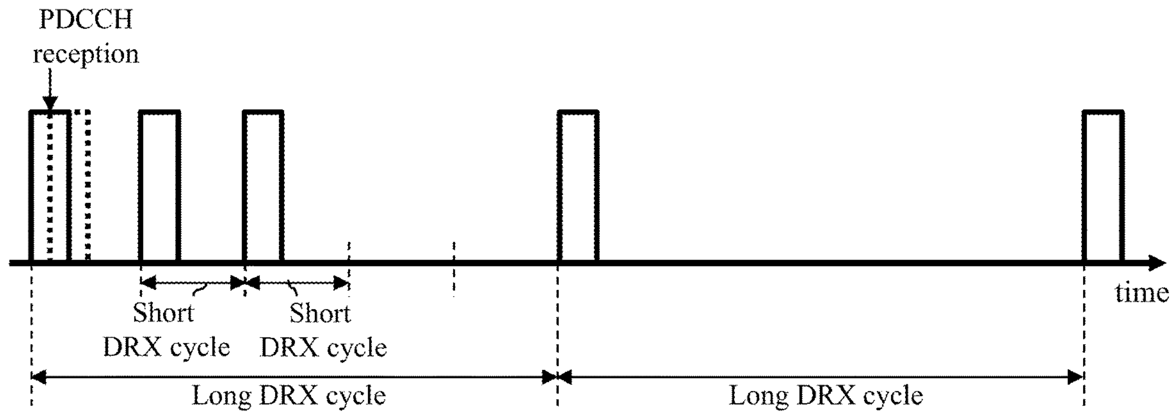
FIG. 12 illustrates a case in which a long DRX cycle and a short DRX cycle are configured.

FIG. 12 illustrates a case in which a long DRX cycle and a short DRX cycle are configured. Specifically, FIG. 12 shows a case in which drx-ShortCycleTimer is set to 2.

The BS may configure a long DRX cycle and an additional short DRX cycle, which is shorter than the long DRX cycle. If no short DRX cycle is configured, the UE may follow the long DRX cycle. When configuring the short DRX cycle, the BS may set the duration of the long DRX cycle to be a positive integer multiple of the short DRX cycle. If there is no data activity during the on-duration of the long DRX cycle, the UE may follow the long DRX cycle as if no short DRX cycle is configured. If there is data activity during the on-duration of the long DRX cycle, for example, while drx-onDurationTimer is running, the UE switches to the short DRX cycle and follows the short DRX cycle for a certain period of time (e.g., while drx-ShortCycleTimer is running). Referring to FIG. 12, if there is no data activity during the time that the UE follows the short DRX cycle, for example, if there is no data activity during the period defined by drx-ShortCycleTimer*drx-ShortCycle, the UE switches from short DRX cycles each having the duration by drx-ShortCycleTimer to the long DRX cycle.

Figure 13:
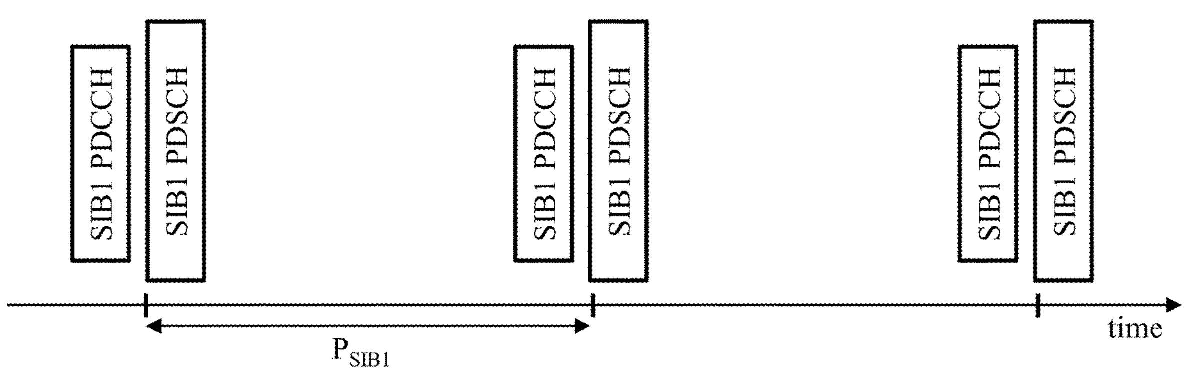
FIG. 13 illustrates transmission of system information block 1 (SIB1) in the 3GPP-based system.

FIG. 13 illustrates transmission of SIB1 in the 3GPP based system. In FIG. 13, $P_{SIB1}$ denotes the transmission periodicity or transmission repetition periodicity of SIB1. In addition, an SIB1 PDSCH represents a PDSCH carrying SIB1, and an SIB1 PDCCH represents a PDCCH carrying a DCI format scheduling the SIB1 PDSCH.

According to the current 5G specifications, in FIG. 13, SIB1, which is a part of the minimum system information required for cell access, is transmitted on a DL-SCH with a periodicity of 160 ms or a variable transmission repetition periodicity within 160 ms. The default transmission repetition periodicity of SIB1 is 20 ms, but the actual transmission repetition periodicity depends on the network implementation. For SSB and CORESET multiplexing pattern 1, the transmission repetition period of SIB1 is 20 ms. For SSB and CORESET multiplexing patterns 2/3, the transmission repetition period of SIB1 is the same as the SSBI period.

A PDCCH monitoring occasion on which the UE attempts to decode the SIB1 PDCCH may be determined based on information in the MIB, for example, pdcch-ConfigSIB1. For example, during cell search, if the UE determines based on the MIB that a Type0-PDCCH CSS set exists, the UE may determine the number of consecutive RBs and the number of consecutive symbols for the CORESET of the Type0-PDCCH CSS set from controlResourceSetZero in pdcch-ConfigSIB1. The UE may also determine PDCCH monitoring occasions from searchSpaceZero in pdcch-ConfigSIB1. For example, for an SSB with index i, the system frame number (SFN) of a frame of the related CORESET, $SFN_C$: a first slot including Type-0 monitoring occasion(s) in the frame corresponding to $SFN_C$, slot no; and a combination of parameter values required to determine the index of the first symbol of the corresponding CORESET in slot no may be provided by searchSpaceZero.

The UE may monitor the Type0-PDCCH CSS set in the PDCCH monitoring occasion to detect the SIB1 PDCCH. The UE may determine frequency resource allocation and time resource allocation of the SIB1 PDSCH from DCI carried by the SIB1 PDCCH. The UE may receive/decode SIB1 based on the frequency resource allocation and time resource allocation.

When the UE has no ongoing data transmissions/receptions, the UE enters RRC_IDLE or RRC_INACTIVE to save power. When DL data for the UE arrives in the network, the network transmits a paging message on a paging occasion (PO) to trigger an RRC Setup procedure and an RRC Connection Resume procedure. The PO refers to a set of PDCCH monitoring occasions and may consist of multiple time slots (e.g., subframes or OFDM symbols). DCI with a CRC scrambled with a P-RNTI may be transmitted on the PO. In multi-beam operations, the UE assumes that the same paging message is repeated in all transmitted beams. The paging message is same for both radio access network (RAN) initiated paging and core network (CN) initiated paging. One paging frame (PF) is one radio frame and may contain one or multiple PO(s) or starting point of a PO. The UE monitors one paging occasion (PO) per DRX cycle. The PF and PO for paging may be determined by predetermined equations. For example, in some implementations, a system frame number (SFN) for the PF may be determined by (SFN+PF_offset) mod T=(T div N)*(UE_ID mod N), and the index i_s indicating the index of the PO may be determined by i_s=floor (UE_ID) mod Ns, where T is the DRX cycle of the UE and determined by the shortest of the UE specific DRX value(s) and/or a default DRX value broadcast in system information, N is the number of total paging frames in T, Ns is the number of paging occasions for a PF, PF_offset is an offset used for PF determination, and UE_ID is a value determined based on 5G-S-TMSI. The following parameters may be signaled in SIB1: a parameter related to the number of POs per paging frame, Ns: a parameter used to derive the number of total paging frames in T, nAndPagingFrameOffset: a parameter related to the number of PDCCH monitoring occasions corresponding to SSBs in a PO, nrofPDCCH-MonitoringOccasionsPerSSB-InPO; and the length of a default DRX cycle. The values of N and PF_offset are derived from the parameter nAndPagingFrameOffset. The PDCCH monitoring occasions for paging are determined based on the following parameters: a parameter indicating the first PDCCH monitoring occasion for paging of each PO of the PF, firstPDCCH-MonitoringOccasionOfPO; and the parameter nrofPDCCH-MonitoringOccasionsPerSSB-InPO. For paging in the initial DL BWP, the parameter firstPDCCH-MonitoringOccasionOfPO may be signaled in SIB1. For paging in a DL BWP other than the initial DL BWP, the parameter firstPDCCH-MonitoringOccasionOfPO may be signaled in the corresponding BWP configuration.

The UE may use Paging Early Indication (PEI) in RRC_IDLE and RRC_INACTIVE states in order to reduce power consumption. If PEI configuration is provided in system information, the UE in RRC_IDLE or RRC_INACTIVE state supporting PEI can monitor PEI using PEI parameters in system information. The UE monitors one PEI occasion per DRX cycle. A PEI occasion (PEI-O) is a set of PDCCH monitoring occasions and can consist of multiple time slots (e.g. subframes or OFDM symbols) where PEI can be sent. In multi-beam operations, the UE assumes that the same PEI is repeated in all transmitted beams. The time location of PEI-O for UE's PO is determined by a reference point and an offset. The reference point is the start of a reference frame determined by a frame-level offset from the start of the first PF of the PF(s) associated with the PEI-O, provided by pei-FrameOffset in SIB1, and the offset is a symbol-level offset from the reference point to the start of the first PDCCH MO of this PEI-O, provided by firstPDCCH-MonitoringOccasionOfPEI-O in SIB1. If one PEI-O is associated with POs of two PFs, the two PFs are consecutive PFs calculated by the parameters PF_offset, T, Ns, and N. The details of the PEI may be found in 3GPP TS 38.304 and 3GPP TS 38.213.

Paging DRX is defined which requires the UE in the RRC_IDLE or RRC_INACTIVE state to monitor paging channels during one PO per DRX cycle. The following paging DRX cycles may be configured by the network: i) for CN-initiated paging, a default cycle is broadcast in system information, ii) for CN-initiated paging, a UE specific cycle can be configured via non-access stratum (NAS) signaling, iii) for RAN-initiated paging, a UE-specific cycle is configured via RRC signaling. The UE uses the shortest of the DRX cycles applicable. For example, a UE in RRC_IDLE may use the shortest of the first two cycles above, and a UE in RRC_INACTIVE may use the shortest of the three.

The energy saving of the BS is significantly considered in wireless communication systems, including 3GPP, due to its potential contribution to building eco-friendly networks through reduction of carbon emissions and curtailing operational expenditures (OPEX) for communication operators. In particular, as the demand for high transmission rates has escalated with the advent of 5G communications, BSs have been required to be equipped with a greater number of antennas and provide services in broader bandwidths and frequency bands. According to recent study, the energy cost of the BS has reached up to 20% of the total OPEX. Due to the increased interest in the energy saving of the BS, 3GPP NR release 18 has approved a new study item called "study on network energy savings." For example, to enhance energy-saving capabilities in terms of the transmission and reception of the BS, this study investigates how to achieve more efficient operations for transmission and/or reception in the time, frequency, space, and power domains dynamically and/or semi-statically with finer granularity of adaptation based on one or more network energy-saving techniques, using potential support/feedback from the UE and potential UE support information.

Hereinafter, implementations of the present disclosure will be described in relation to methods and procedures for saving the energy of the BS in the time domain by reducing transmission of common signals/channels such as an SSB, SIB1, other SI, and/or paging or by transmitting common signals/channels in an on-demand way.

According to some implementations of the present disclosure, in light-load situations where the BS has almost no data to transmit, the BS may save energy by turning off transmission/reception of a specific DL/UL signal and channel for a specific time period or by reducing the amount of frequency resources such as an operational BWP. For example, the BS may control transmissions/receptions on a carrier/cell based on scheduling on the carrier/cell. However, considering that transmission of common signals/channels such as the SSB/SIB1/other SI/paging is essential for cell (re) selection, initial access, radio resource management (RRM) measurement, etc., the common signals/channels are considered as always-on signals/channels that need to be transmitted periodically. If the BS does not transmit the signals at all or transmits the signals with excessively long periodicities, issues may occur in cell detection, time and frequency synchronization, paging, radio link management (RLM), and/or RRM measurement of the UE. As a result, the performance of UEs that access a corresponding cell may be degraded. Therefore, when the BS intends to drop or reduce transmission of cell-common signals/channels related to cell detection, time and frequency synchronization, paging, RLM, and/or RRM measurement of the UE, except for signals/channels that the BS is capable of scheduling or configuring depending on the load conditions of the BS (e.g., PDCCH/PUSCH/PDSCH/CSI-RS/SRS, etc.), in order to operate in a network energy saving (NES) mode on the cell, methods for minimizing the impact on UEs is needed.

Accordingly, in some implementations of the present disclosure, when the BS aims to save energy by reducing transmission of common signals/channels or increasing transmission periodicities thereof on a carrier/cell for a specific time period, the BS may configure alternative carriers/cells where UE(s) are capable of receiving the common signals/channels with shorter periodicities or transmit SI and/or paging in an on-demand way. This method may achieve the energy saving of the BS/network while minimizing degradation in the performance of the UE.

In the following, the operation of the BS in the NES mode for the purpose of energy saving (ES) may mean that the BS preconfigures a plurality of OFF periods (i.e., discontinuous transmission (DTX) periods) where transmission of a specific DL signal is turned off during a specific time period and then dynamically indicates one of the OFF periods to notify that the corresponding DL signal will not be transmitted during the predefined time period, in order to achieve power consumption reduction for both the BS and UE. The NES mode may also be applied not only to the time domain but also to the following operations in the frequency domain: BWP switching, dynamic RB adaptation, etc. For the spatial domain, the NES mode may refer to an operation mode in which when the BS semi-statically or dynamically disables a specific receiving antenna port, the BS refrains from performing transmission and/or reception on the corresponding antenna port to achieve power consumption reduction for both the BS and UE.

<Method #1> Method(s) for configuring a carrier/cell on which the UE is capable of receiving a common signal/channel (e.g., SSB/SIB/paging, etc.) when the BS intends to reduce transmission of the common signal/channel or configure a long periodicity therefor to transition to the NES mode during a specific time period; and method(s) for the BS to determine whether to transition to the NES mode based on feedback from the UE. Specifically, the following methods may be applied.

(1-1) The BS may configure/indicate or broadcast in advance to the UE a period (starting point or duration) in which the transmission of the common signal/channel is reduced or the periodicity is increased on the carrier/cell. The BS may also configure/indicate information regarding another carrier/cell on which the UE(s) are capable of receiving the common signal/channel for the carrier/cell during the corresponding period.

(1-2) The BS may repeatedly perform broadcast transmission regarding the starting point of the NES mode, where the transmission of the common signal/channel on the carrier/cell is reduced or the periodicity thereof is increased. Then, The BS may receive feedback information (e.g., assistance information) from UEs and determine whether to actually transition to the NES mode.

i. In some implementations, the BS may receive a report on coverage information, the service type, the location within the cell, SI, or information regarding whether measurement resources are need from the UE and then determine a common signal/channel of which the periodicity needs to be changed.

ii. In some implementations, the BS may inquire the UE about the possibility of transitioning to the NES mode through group-common DCI or a MAC control element (CE) in a polling manner. Then, the BS may determine whether to transition to the NES mode based on the HARQ-ACK feedback result from the UE.

iii. In some implementations, the BS may instruct UEs (supporting the NES mode) (or UEs whose RSRP is less than or equal to a specific value) to transmit a sounding reference signal (SRS) or a specific UL signal/channel on a preconfigured/predetermined specific resource. Then, the BS may determine whether to transition to the NES mode by assessing the state of UEs within the cell (e.g., cell edge UEs).

Hereinafter, the methods mentioned above in (1-1) and (1-2) will described in more detail. The methods described in (1-1) and (1-2) may be applied independently or in combination.

In some implementations of the present disclosure, the BS may achieve network energy saving by turning off or reducing transmission/reception on some cells managed by the BS in the NES mode.

Figure 14:
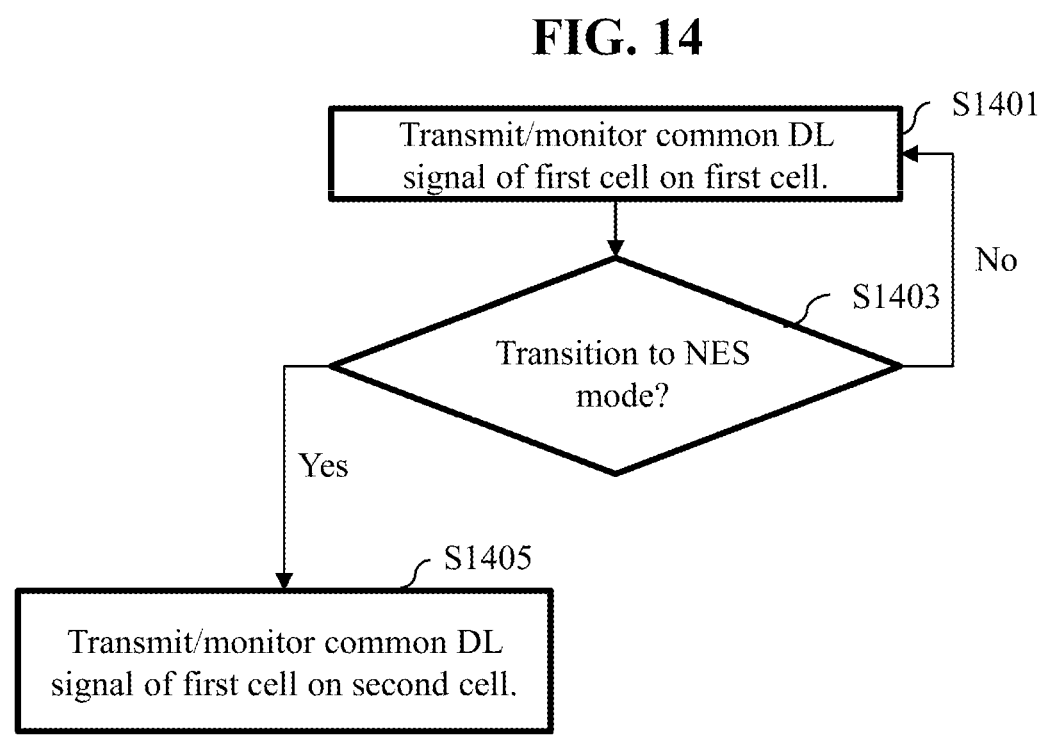

FIG. 14 illustrates a flow of transmission or reception of a common signal/channel according to some implementations of the present disclosure. During a time period other than the NES mode, the BS provides a common signal/channel of a first cell on the first cell with a predetermined first periodicity (S1401). During the time period other than the NES mode, the UE monitors the common signal/channel of the first cell on the first cell with the predetermined first periodicity (S1401). The UE may be indicated/configured with a second cell on which the common signal/channel of the first cell is transmitted during the NES mode. When the BS and UE enters the NES mode (Yes in S1403), the BS may transmit the common signal/channel of the first cell on the second cell associated with the first cell (S1405), and the UE may monitor the common signal/channel of the first cell on the second cell (S1405). In some implementations, during a time period for the NES mode, the BS may transmit the common signal/channel of the first cell on the first cell with a second periodicity, which is configured longer than the first periodicity. During the time period for the NES mode, the UE may monitor the common signal/channel of the first cell on the first cell with the second periodicity configured longer than the first periodicity.

FIG. 15 illustrates common signal/channel occasions of cells according to some implementations of the present disclosure. In the example of FIG. 15, it is assumed that cell A is a cell in which the transmission periodicity of a common signal/channel is changed during the NES mode and cell B is a cell in which the transmission periodicity of a common signal/channel X is not changed during the NES mode. In FIG. 15, $P_{A\_X\_1}$ represents the periodicity of a (transmission/reception) occasion for common signal/channel X of cell A when not in the NES mode, and $P_{A\_X\_2}$ represents the periodicity of a (transmission/reception) occasion for common signal/channel X of cell A in the NES mode, where $P_{A\_X\_2}$ is longer than $P_{A\_X\_1}$. In addition, $P_{B\_X}$ represents the periodicity of a (transmission/reception) occasion of common signal/channel X of cell B. In this case, $P_{A\_X\_1}$ and $P_{B\_X}$ may be the same or different. In some implementations, $P_{A\_X\_2}$ may be a positive integer multiple of $P_{A\_X\_1}$. Common signal/channel X may be an SSB, SIB1, other SI (i.e. an SIB other than SIB1), or paging. The (transmission/reception) periodicity and/or occasion for common signal/channel X may be defined (in specifications) depending on the type of the corresponding common signal/channel or configured by the BS. FIG. 15 shows that the transmission/reception periodicity of common signal/channel X of cell A during the NES mode becomes longer than that during the NES mode. However, the transmission/reception of common signal/channel X on cell A may be omitted during the NES mode. In addition, FIG. 15 shows that the occasion of common signal/channel X on cell A in the NES mode is determined based on the last occasion of common signal/channel X in the non-NES mode. However, $P_{A\_X\_2}$ may be applied after entering the NES mode or after a certain period of time after entering the NES mode. In some implementations, the BS may transmit common signal/channel X of cell A on cell B while cell A is operating in the NES mode. In some implementations, considering the possibility that the NES mode transition configuration/indication is lost, the BS may transmit common signal/channel X of cell A on cell B regardless of whether the NES mode is applied to cell A. When the common signal/channel of cell A is transmitted on cell B, the periodicity of the common signal/channel of cell A on cell B may be the same as or different from when the common signal/channel of cell A is transmitted on cell A. The periodicity of the common signal/channel of cell A may be defined or configured as a positive integer multiple of $P_{A\_X\_2}$ on the cell B. Alternatively, the periodicity of the common signal/channel of cell A may be defined or configured as the same as the periodicity of the common signal/channel of the cell B, $P_{B\_X}$ or as a positive integer multiple of $P_{B\_X}$.

In some implementations of the present disclosure, the BS may configure/indicate an absolute or relative time regarding when to transition to the NES mode and change the transmission periodicity of the common signal/channel. For example, the BS may configure/indicate to UE(s) an SFN at which the UE(s) transition to the NES mode and change the transmission periodicity of the common signal/channel. As another example, the BS may transition to the NES mode after a lapse of a specific time from transmitting a broadcast signal that configures/indicates the transition to the NES mode or after a lapse of a specific time from a specific transmission occasion (e.g., the last transmission occasion before the transition to the NES mode is configured/instructed) of the common signal/channel of which the transmission periodicity is to be changed. The specific time may be configured/indicated by the BS to UE(s) or specified in specifications/systems. As a further example, the BS may additionally indicate the absolute time by providing an offset value (e.g., in units of slots or symbols) for a specific SFN. Alternatively, the BS may indicate the relative time by providing a specific offset (e.g., in units of slots or symbols) from the time of transmitting/receiving an indication of the transition to the NES mode.

When the BS arbitrarily reduces transmission of common signals/channels such as the SSB/SIB or transmit the common signals/channels with excessively long transmission periodicities, issues may occur in cell detection and time and frequency synchronization of the UE. Therefore, when the BS arbitrarily reduces the transmission frequency of common signals/channels such as the SSB/SIB or configures long transmission periodicities therefor, there is a need for a method for providing the common signals/channels through alternative paths. In some implementations of the present disclosure, when the BS intends to transition to the NES mode for a specific time period in order to reduce transmission of common signals/channels (e.g., SSB/SIB/paging, etc.) or configure longer periodicities, the BS may configure/indicate information regarding the time period during which the NES mode is applied. Additionally, by configuring to UE(s) other carrier(s)/cell(s) (e.g., cell B in FIG. 15) on which the BS always transmits common signals/channels with shorter periodicities, the BS may not only minimize the impacts of corresponding carriers/cells where the reception occasions for the common signals/channels decrease during the time period of the NES mode on the performance of the UE(s) but also reduce its own energy consumption. In this case, the other carrier/cell (e.g., cell B in FIG. 15) for carrying the common signals/channels of the carrier/cell (e.g., cell A in FIG. 15) operating in the NES mode may also carry SI on the carrier/cell (e.g., cell A in FIG. 15) operating in the NES mode. On the other hand, information regarding a time period (e.g., starting point and duration) during which the BS/UE operate in the NES mode and information regarding a carrier/cell via which the UE(s) receive common signals/channels (e.g., cell index) may be preconfigured semi-statically through higher layer signaling such as RRC signaling. Alternatively, the BS may configure multiple candidates obtained by combining the starting points, durations of the NES mode and specific carrier/cell indices through RRC (i.e., RRC signaling) and then dynamically indicate one of the multiple candidates in group-common DCI. In this case, the starting point of the NES mode may be specified or indicated as an absolute or relative time. For example, the BS may assign or indicate to UE(s) an SFN at which the NES mode starts. As another example, the BS may transition to the NES mode after a lapse of a specific time from the time of transmitting a broadcast signal that configures/indicates the transition to the NES mode or after a lapse of a specific time from a specific transmission occasion (e.g., the last transmission occasion before the transition to the NES mode is configured/instructed) of a common signal/channel of which the transmission periodicity is to be changed. The specific time may be configured/indicated by the BS to UE(s) or specified in specifications/systems. As a further example, the BS may additionally indicate the absolute time by providing an offset value (e.g., in units of slots or symbols) for a specific SFN. Alternatively, the BS may indicate the relative time by providing a specific offset (e.g., in units of slots or symbols) from the time of transmitting/receiving an indication of the transition to the NES mode.

When the BS intends to operate in the NES mode for a specific period to conserve energy, the BS may need to urgently transmit/receive data in a cell or there may be a UE that needs to receive a specific common signal/channel for measurement or SI acquisition. Additionally, considering the following issues: loss of a configuration/indication/notification for transition to the NES mode; and UE's failure to decode the corresponding transition configuration/indication/notification, the BS may repeatedly transmit a signal/channel notifying UEs of the transition to the NES mode several times before transitioning to the NES mode and then receive feedback from the UEs to determine whether to transition to the NES mode at the actually indicated time. The feedback provided by a UE may include information regarding the coverage, information regarding the service type (for example, information regarding whether high throughput is required), information regarding the position of the UE within the cell (for example, information regarding whether the UE is located at the cell edge), information regarding whether there is a need for SI or measurement resources, or any combination thereof. Upon receiving the corresponding feedback information, the BS may cancel the transition to the NES mode, that is, the BS may not proceed with the transition to the NES mode at the time indicated by the BS as the starting point of the NES mode. Alternatively, if the BS receives feedback indicating that the UE requires a specific common signal/channel, for example, specific SI, the corresponding common signal/channel may be excluded from the transmission reduction target.

In some implementations, before transitioning to the NES mode, the BS may transmit group-common DCI to UE(s) to poll whether the transition to the NES mode is acceptable. Based on HARQ-ACK feedback information received from the UEs (e.g., ACK or NACK (A/N), ACK-only, or NACK-only), the BS may determine whether to actually execute the NES transition at the transition time point indicated/configured by the BS. Alternatively, by instructing UEs to transmit an SRS (SR, RACH, etc.) on preconfigured resources (for example, only for advanced UEs supporting the NES mode or UEs within the cell whose RSRP is below a predefined/preconfigured threshold (e.g., RSRP based on a specific RS configured by the BS such as an SSB/CSI-RS)), the BS may assess the states of the UEs within the cell (for example, cell edge UEs) to determine whether to transition to the NES mode.

In some implementations, to transition to the NES mode, the BS may perform polling for feedback by transmitting group-common DCI to UEs within the cell. The UEs may provide feedback on the transition possibility by transmitting A/N, ACK-only, or NACK-only according to predefined agreements (e.g., defined in specifications) or based on configurations/instructions provided by the BS. For example, the UE may transmit an ACK to notify that transitioning, by the BS, to the NES mode is acceptable. If the UE has data to transmit, the UE may transmit a NACK to provide assistance information to the BS. Alternatively, the UE may be configured to always transmit NACK-only (or ACK-only) to prevent the BS from transitioning to the NES mode only if the UE has data to transmit or receive. In contrast, the UE may be configured to always transmit NACK-only (or ACK-only) to indicate that transitioning to the NES mode is acceptable. In this case, a PUCCH resources for ACK-only or NACK-only may be configured in a cell-specific or UE group-common manner. For example, in the case of ACK-only, the UE may transmit feedback only when the UE's decoding result for DCI/data is an ACK or when the UE accepts the NES transition of the BS. Otherwise, the UE may transmit no feedback. Conversely, in the case of NACK-only, the UE may transmit feedback only when the UE's decoding result for DCI/data is a NACK or when the UE does not accept the NES transition of the BS. Otherwise, the UE may transmit no feedback.

For specific signals/channels (e.g., common signals/channels such as the SSB/SIB1), if the UE has data to transmit or receive (for example, if the UE needs to perform periodic SSB measurement for RLM or RRM), the UE may also transmit an ACK or NACK. For example, when the BS transitions to the NES mode, common signals/channels such as the SSB/SIB1 may be transmitted with a long periodicity or omitted altogether during the NES mode operation. Thus, if the UE needs to receive the SSB or SIB1 at the time of receiving group-common DCI for polling transmitted from the BS, the UE may transmit an ACK or NACK to the BS to assist the BS in determining the transition to the NES mode. On the other hand, when predetermined conditions are met, for example, when the RSRP within the cell falls below a predefined/preconfigured threshold, the UE may transmit an ACK or NACK over an SRS or PUCCH or transmit a preconfigured/predefined UL signal/channel (e.g., RACH), regardless of whether the UE has UL data to transmit. Accordingly, the BS may assess the states of UEs within the cell (for example, cell edge UEs) to determine whether to transition to the NES mode.

In some implementations of the present disclosure, NES mode configurations applied to a cell may be provided through the cell itself or through one of the serving cells of the UE.

<Method #2> Method(s) of transmitting/receiving a common signal/channel (e.g., SIB1/paging, etc.) in an on-demand manner (2-1) When the BS transmits an SIB1 PDCCH through beam sweeping in a plurality of beam directions and when the UE informs its need for SIB1 over a RACH using a preconfigured/predefined resource, the BS transmits the SIB1 PDCCH and/or an SIB1 PDSCH only in a beam direction related to the RACH.

i. If the BS is capable of including information that triggers on-demand SIB1 on the SIB1 PDCCH, the BS may transmit the SIB1 PDCCH across all beams and transmit the SIB1 PDSCH only through the beam for which there is the RACH among the beams.

(2-2) When DCI carried by an SIB1 PDCCH contains scheduling information for an SIB1 PDSCH (and also includes configuration information regarding a RACH for requesting on-demand SIB1), if the UE transmits the RACH, the SIB1 PDSCH is transmitted/received at a relative position in reference to a corresponding RACH timing or a specific reference timing (based on the scheduling information provided by the DCI).

i. When the SIB1 PDCCH (or any PDCCH including RACH configuration information without scheduling information for the SIB1 PDSCH) provides only the configuration information regarding the RACH for requesting the on-demand SIB1 with no PDSCH scheduling information, if the UE transmits the RACH, the BS transmits a (normal) SIB1 PDCCH and an SIB1 PDSCH scheduled by the SIB1 PDCCH.

(2-3) When paging DCI contains paging PDSCH scheduling information, if the UE transmits a RACH, a paging PDSCH is transmitted/received at a relative position in reference to a corresponding RACH timing or a reference timing (based on the scheduling information provided by the DCI).

i. When the paging DCI contains only information regarding the presence of paging with no PDSCH scheduling information, if the UE transmits the RACH (where a resource for transmitting the corresponding RACH may be configured/indicated by the paging DCI), the BS transmits (normal) paging DCI and a paging PDSCH scheduled by the paging DCI.

(2-4) For reception of paging by the UE, when a RACH resource for requesting on-demand paging is preconfigured, paging is requested using the configured RACH resources in a non-broadcast state, based on an indication indicating whether corresponding paging information is in a broadcast state (for example, in a state where the paging information is capable of being transmitted on a PO in a preconfigured PF) or in the non-broadcast state (for example, in a state where the BS enters the NES mode and transmits paging only when requested by the UE in an on-demand manner). Alternatively, whether the paging information is in the broadcast state is implicitly indicated by the presence or absence of the RACH resource configured for requesting the on-demand paging.

(2-5) The UE may determine whether to attempt paging reception after confirming the ACK for an on-demand request.

i. In this case, the ACK information may be included in a paging PDCCH for the purpose of ACK confirmation. Alternatively, the ACK confirmation may be replaced by reception of the paging PDCCH.

ii. Unlike a conventional paging PDCCH that is repeated on multiple beams through beam sweeping, an on-demand paging PDCCH does not require transmission through beam sweeping because the UE informs an SSB associated with RACH transmission over the RACH transmission. In other words, the BS transmits the on-demand paging PDCCH in a corresponding beam direction in which the RACH is received.

iii. After performing the RACH transmission, the UE determines whether to monitor Paging Early Indication/Wake-Up Signal (PEI/WUS) on the corresponding beam according to configurations/instructions/promises.

Hereinafter, the methods mentioned above in (2-1) and (2-5) will described in more detail. The methods described in (2-3) and (2-5) may be applied independently or in combination.

To schedule SIB1 including essential information for cell access as well as an SSB, a Type #0 CSS (i.e., Type0-PDCCH CSS) also needs to be transmitted periodically. Therefore, a method of reducing transmission of the Type #0 CSS or extending its periodicity may also be considered from the perspective of energy conservation for the BS. The periodicity of the Type #0 CSS is 20 ms (for SSB/CORESET 0 multiplexing pattern 1 (i.e., SSB and CORESET multiplexing pattern 1)), and the periodicity of the Type #0 CSS is the same as the SSB periodicity (for SSB/CORESET multiplexing patterns 2 or 3). Typically, since monitoring only three to five SSBs may be sufficient to decode SIB1 by obtaining fine synchronization, which may depend on the UE implementation, Type #0 CSS transmission(s) associated with the remaining SSB(s) may be considered unnecessary and viewed as energy waste. Therefore, for example, if the UE is allowed to achieve synchronization and perform decoding of the Type #0 CSS with only three SSBs for SSB/CORSET0 multiplexing patterns 2 or 3, the actual required Type #0 CSS periodicity may be set to about three times the SSB periodicity. Accordingly, the BS may save energy due to the reduced Type #0 CSS transmission. Therefore, if transmission of common signals/channels such as an SIB1 PDCCH, SIB1 PDSCH, paging PDCCH, and/or paging PDSCH is reduced or if the common signals/channels are transmitted on-demand according to the UE's request, it is possible to assist in saving energy for both the BS and UE.

Instead of transmitting the SIB1 PDCCH and SIB1 PDSCH in all beam directions based on beam sweeping where the beams (or beam directions) of radio signals vary over time, the BS may transmit only the SIB1 PDCCH based on the beam sweeping. If the UE informs the need for the SIB1 PDCCH/PDSCH over a RACH using preconfigured/predefined resources, the BS may transmit the SIB1 PDCCH/PDSCH only in a beam direction associated to the RACH for energy saving. Alternatively, if the BS is allowed to load information that triggers on-demand SIB1 on the SIB1 PDCCH, the BS may transmit the SIB1 PDSCH only on the beam associated with the RACH while transmitting the SIB1 PDCCH in all beam directions through the beam sweeping.

When the SIB1 PDCCH includes scheduling information for the SIB1 PDSCH (including RACH configuration information for requesting on-demand SIB1), if the UE transmits the RACH (in this case, information regarding a RACH resource associated with the SIB1 PDCCH may be predefined in specifications or indicated by the SSB), the SIB1 PDSCH may be transmitted/received at a relative position in reference to a corresponding RACH timing or a specific reference timing (based on the scheduling information provided by DCI carried over the SIB1 PDCCH). As another example, when the (SIB1) PDCCH includes only the RACH configuration information for requesting on-demand SIB1 with no PDSCH scheduling information, if the UE transmits the RACH (in this case, information on a related RACH resource may be provided by the corresponding PDCCH), the BS may transmit a (normal) SIB1 PDCCH and an SIB1 PDSCH scheduled by the SIB1 PDCCH after receiving the RACH. The UE may expect to receive the (normal) SIB1 PDCCH (in the SSB or beam direction) associated with the transmitted RACH.

A method similar to that for SIB1 may also be applied to paging DCI and a paging PDSCH. For example, when the paging DCI includes scheduling information for the paging PDSCH, if the UE transmits the RACH (in this case, information on a RACH resource associated with the paging DCI may be predefined in specifications or indicated by the SSB), the paging PDSCH may be transmitted/received at a relative position in reference to a corresponding RACH timing or a specific reference timing (based on the scheduling information provided by the paging DCI). As another example, when the paging DCI contains only information on the presence of paging with no PDSCH scheduling information, if the UE transmits the RACH (in this case, information on a related RACH resource may be provided by the paging DCI), the BS may transmit (normal) paging DCI and a paging PDSCH scheduled by the paging DCI. The UE may expect to receive the (normal) paging DCI (in the SSB or beam direction) associated with the transmitted RACH.

For reception of paging by the UE, when a RACH resource for requesting on-demand paging is configured, the UE may request paging using the configured RACH resources in a non-broadcast state (or when it is indicated/configured that paging information is transmitted after an on-demand process), based on an indication or configuration indicating whether the corresponding paging information is in a broadcast state (for example, in a state where the paging information is capable of being transmitted on a PO in a preconfigured PF) or in the non-broadcast state (for example, in a state where the BS enters the NES mode and transmits paging only when requested by the UE in an on-demand manner) (for example, depending on the indication/configuration of whether the corresponding paging information is transmitted after the on-demand process or broadcast with no on-demand process as in the prior art). The UE may determine whether to attempt paging reception after confirming the ACK for an on-demand request. In this case, the ACK information may be included in a paging PDCCH for the purpose of ACK confirmation. Alternatively, the ACK confirmation may be replaced by reception of the paging PDCCH. Alternatively, whether the paging information is in the broadcast state may be implicitly indicated by the presence or absence of the RACH resource configured for requesting the on-demand paging. For example, if the RACH resource for requesting the on-demand paging is configured, the UE may implicitly know that the BS transmits paging only if the UE transmits RACH because the BS is currently operating the on-demand paging, rather than broadcasting the paging.

For an on-demand paging PDCCH, the UE informs an associated SSB associated through RACH transmission, unlike a conventional paging PDCCH transmitted based on beam sweeping. Thus, the BS may transmit the on-demand paging PDCCH in a beam direction in which the RACH is received. In addition, after transmitting the RACH, the UE may determine whether to monitor a PEI/WUS on the corresponding beam according to configurations/instructions/promises.

Additionally, in the above-described methods, if an SSB group is predefined by grouping one or more SSB indices, and if the UE transmits a request for an on-demand SSB/paging such as the WUS using a specific UL signal/channel, the BS may not only transmit a specific SSB related to the request for the on-demand the SIB or paging from the UE but also may transmit the entire SSB group including the corresponding SSB. For example, when SSB group #1 is configured to include SSB indices #0, #1, and #2, and SSB group #2 is configured to include SSB indices #3, #4, and #5, if the UE desires to receive SIB1 or paging corresponding to SSB index #3, the UE may transmit the WUS using a UL signal and channel corresponding to SSB group #2, which is preconfigured/predefined. Upon receiving the WUS, the BS may transmit SIB1 or paging corresponding to all SSB indices #3, #4, and #5 associated with SSB group #2.

Method #1 and Method #2 described above may be applied independently or in combination. For example, in some implementations, if a specific cell operates in the NES mode for a certain period of time according to Method #1, and if other cells configured/indicated to transmit a common signal/channel for the specific cell also operate in the NES mode, Method #2 may be applied. As another example, in some implementations, the cell or UE may be configured with the NES mode according to Method #1 or the NES mode according to Method #2. When the NES mode according to Method #1 is configured, the BS and UE may operate according to Method #1. When the NES mode according to Method #2 is configured, the BS and UE may operate according to Method #2.

According to Method #1 and/or Method #2 described above, the BS may schedule the UE to perform transmission/reception on other cells during the NES mode, rather than a cell where the occasions for common signals/channels need to be controlled, in order to minimize the transmission/reception on the cell and secure a relatively longer duration for operating in the sleep mode (or inactive state), thereby achieving energy savings for both the BS and UE.

In LTE-based systems, the BS may use the following operation: Cell ON/OFF, which allows the BS to adaptively turn on and off DL transmission on a cell. For a cell on which ON/OFF is performed, only periodic discovery signals including CRSs for specific antenna port(s), PSSs, SSSs, and non-zero-power CSI-RSs may be transmitted. The period of a discovery signal occasion where the discovery signals for the cell are expected to be present may have a duration of 12 OFDM symbols within one to five consecutive subframes for frame structure type 1, which is applicable to both full-duplex and half-duplex frequency division duplex (FDD): two to five consecutive subframes for frame structure type 2, which is applicable only to time division duplex (TDD); and a single non-empty subframe for frame structure type 3, which is applicable to licensed-assisted access (LAA) secondary cell operation with a normal CP. The periodicity or positions of subframes where the UE is capable of assuming the discovery signal occasion is determined for each frame structure type. According to Cell ON/OFF in the conventional system (e.g., LTE), even if a cell is turned off, a discovery signal composed of periodic CRSs is transmitted periodically, and it is difficult to dynamically turn on/off signals/channels for a specific time period at the symbol level. The BS may configure a cell not used for data transmission for a certain period of time as an SCell deactivated for the UE. When the SCell is deactivated, the UE does not transmit an SRS configured on the corresponding SCell, does not transmit UL-SCHs on the corresponding SCell, does not perform PDCCH monitoring on/for the corresponding SCell, and does not perform UE operations related to the deactivated SCell such as transmitting no RACH on the corresponding SCell. Even if a specific cell is the SCell deactivated for a UE, data transmission on the specific cell may occur for other UEs. Therefore, for a cell deactivated for any UE, the BS may need to perform transmission/reception for other UEs on the cell unless the BS instructs all UEs using the cell as a serving cell to perform deactivation. In addition, even if a cell is deactivated, common signals/channels such as the SSB/SIB1/other SI/paging may need to be continuously transmitted on the corresponding cell for cell detection and time and frequency synchronization of other UEs. According to some implementations of the present disclosure, it is possible to dynamically turn ON/OFF common signals/channels of a cell for a specific time period and/or at the symbol level, which enables faster control of the common signals/channels of the cell, compared to the conventional Cell ON/OFF operation. Additionally, since the BS is capable of turning on and off transmission of the common signals/channels of the cell at a finer resolution, for example, at the symbol level, the BS may flexibly and rapidly adjust the periodicity of occasions for the common signals/channels, depending on the load status of the BS. In addition, according to some implementations of the present disclosure, since the cell detection, time and frequency synchronization, and paging for the UE, where the periodicity of the common signals/channels is adjusted, are provided through other cells. Furthermore, according to some implementations of the present disclosure, the BS may reduce the occasions for transmitting the common signals/channels on the cell without deactivating the cell or turning the cell off for each UE.

Figure 16:
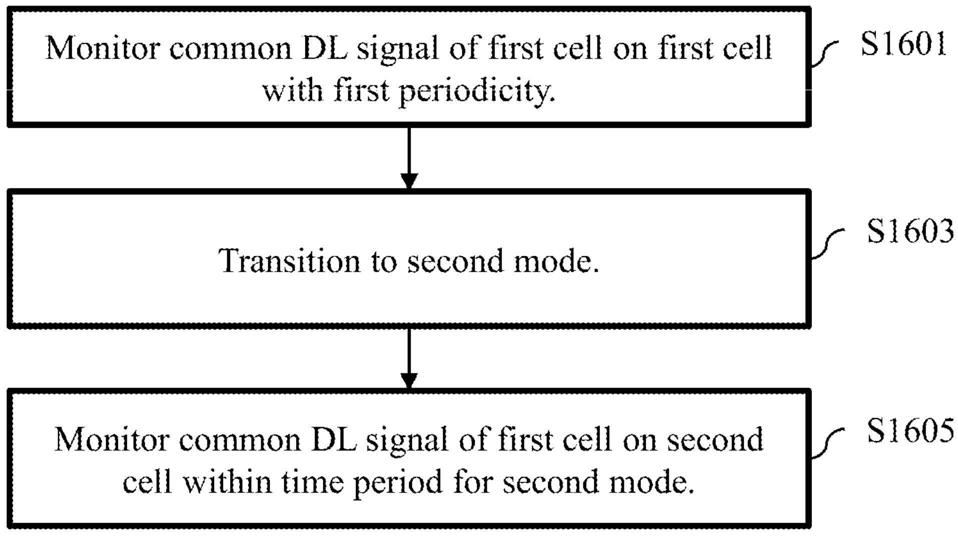
FIG. 16 illustrates a flow of downlink (DL) signal reception by a user equipment (UE) according to some implementations of the present disclosure.

FIG. 16 illustrates a flow of DL signal reception by a UE according to some implementations of the present disclosure.

The UE may perform operations according to some implementations of the present disclosure in association with DL signal receptions. The UE may include at least one transceiver; at least one processor; and at least one computer memory operably connectable to the at least one processor and storing instructions that, when executed, cause the at least one processor to perform operations according to some implementations of the present disclosure. A processing device for a UE may include at least one processor; and at least one computer memory operably connectable to the at least one processor and storing instructions that, when executed, cause the at least one processor to perform operations according to some implementations of the present disclosure. A computer readable (non-volatile) storage medium may store at least one computer program including instructions that, when executed by at least one processor, cause the at least one processor to perform operations according to some implementations of the present disclosure. A computer program or a computer program product may include instructions recorded in at least one computer readable (non-volatile) storage medium and causing, when executed, (at least one processor) to perform operations according to some implementations of the present disclosure.

A method performed by the UE or the operations for the UE, processing device, computer-readable (non-volatile) storage medium, and/or computer program product may include: monitoring a common DL signal of a first cell on the first cell in a first mode with a first periodicity (S1601): receiving a configuration related to a second mode, wherein the configuration related to the second mode includes information regarding a time period for the second mode and cell information regarding a second cell associated with the first cell; and monitoring the common DL signal of the first cell on the second cell within a first time period (S1605), based on transition from the first mode to the second mode (S1603).

In some implementations, the method or operations may further include monitoring the common DL signal of the first cell within the first time period with a second periodicity longer than the first periodicity.

In some implementations, the common DL signal of the first cell may be SI of the first cell.

In some implementations, the common DL signal of the first cell may be a paging message.

In some implementations, the common DL signal of the first cell may be an SSB consisting of a PSS of the first cell, an SSS of the first cell, and a PBCH of the first cell.

In some implementations, the method or operations may include: detecting a group-common DCI format related to the transition to the second mode; and transitioning from the first mode to the second mode based on the group-common DCI format.

In some implementations, the information regarding the time period for the second mode may include configurations for a plurality of time periods. The group-common DCI format may include information indicating the first time period among the plurality of time periods.

In some implementations, the method or operations may further include transmitting an ACK or NACK for the transition to the second mode based on the group-common DCI format.

In some implementations, the method or operations may include: receiving a configuration related to a third mode, wherein the configuration related to the third mode includes information regarding a time period for the third mode; monitoring a PDCCH for SIB1 of the first cell on the first cell within a second time period, based on transition from the first mode to the third mode: transmitting an S1B1 request on a RACH resource related to the SIB1 PDCCH, based on detection of an SIB1 PDCCH for SIB1; and receiving a PDSCH carrying SIB1, based on the transmission of the SIB1 request.

Figure 17:
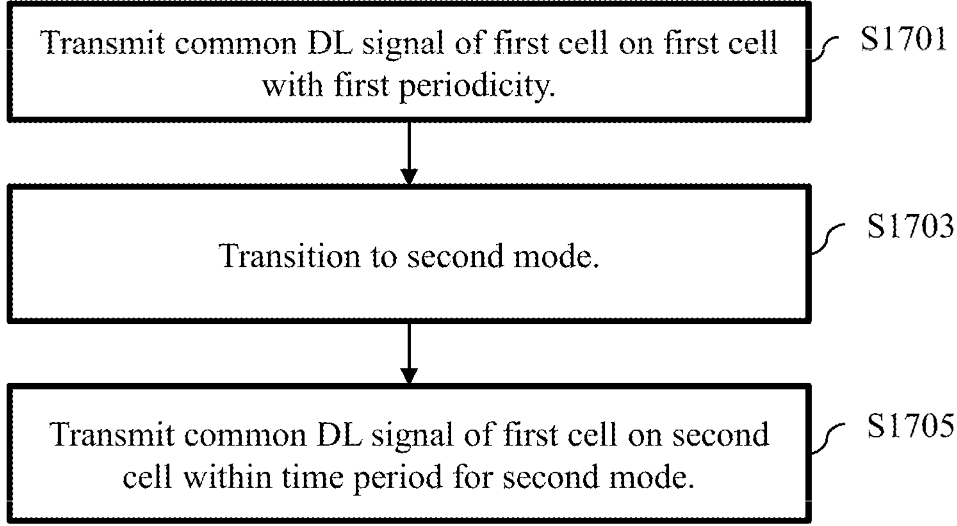
FIG. 17 illustrates a flow of DL signal transmission by a base station (BS) according to some implementations of the present disclosure.

FIG. 17 illustrates a flow of DL signal transmission by a BS according to some implementations of the present disclosure.

The BS may perform operations according to some implementations of the present disclosure in association with DL signal transmissions. The BS may include at least one transceiver; at least one processor; and at least one computer memory operably connectable to the at least one processor and storing instructions that, when executed, cause the at least one processor to perform operations according to some implementations of the present disclosure. A processing device for a BS may include at least one processor; and at least one computer memory operably connectable to the at least one processor and storing instructions that, when executed, cause the at least one processor to perform operations according to some implementations of the present disclosure. A computer readable (non-volatile) storage medium may store at least one computer program including instructions that, when executed by at least one processor, cause the at least one processor to perform operations according to some implementations of the present disclosure. A computer program or a computer program product may include instructions recorded in at least one computer readable (non-volatile) storage medium and causing, when executed, (at least one processor) to perform operations according to some implementations of the present disclosure.

A method performed by the BS or the operations for the BS, processing device, computer-readable (non-volatile) storage medium, and/or computer program product may include: transmitting a common DL signal of a first cell on the first cell in a first mode with a first periodicity (S1701); receiving a configuration related to a second mode, wherein the configuration related to the second mode includes information regarding a time period for the second mode and cell information regarding a second cell associated with the first cell; and transmitting the common DL signal of the first cell on the second cell within a first time period (S1705), based on transition from the first mode to the second mode (S1703).

In some implementations, the method or operations may include transmitting the common DL signal of the first cell within the first time period with a second periodicity longer than the first periodicity.

In some implementations, the common DL signal of the first cell may be SI of the first cell.

In some implementations, the common DL signal of the first cell may be a paging message.

In some implementations, the common DL signal of the first cell may be an SSB consisting of a PSS of the first cell, an SSS of the first cell, and a PBCH of the first cell.

In some implementations, the method or operations may further include transmitting a group-common DCI format related to the transition to the second mode.

In some implementations, the method or operations may include transitioning from the first mode to the second mode based on the transmission of the group-common DCI format.

In some implementations, the information regarding the time period for the second mode may include configurations for a plurality of time periods. The group-common DCI format may include information indicating the first time period among the plurality of time periods.

In some implementations, the method or operations may further include receiving an ACK or NACK for the transition to the second mode based on the group-common DCI format.

In some implementations, the method or operations may include: transmitting a configuration related to a third mode related, wherein the configuration related to the third mode includes information regarding a time period for the third mode: transmitting an SIB1 PDCCH for SIB1 of the first cell on the first cell within a second time period, based on transition from the first mode to the third mode: receiving an S1B1 request on a RACH resource related to the SIB1 PDCCH; and transmitting a PDSCH carrying SIB1, based on the reception of the S1B1 request.

The examples of the present disclosure as described above have been presented to enable any person of ordinary skill in the art to implement and practice the present disclosure. Although the present disclosure has been described with reference to the examples, those skilled in the art may make various modifications and variations in the example of the present disclosure. Thus, the present disclosure is not intended to be limited to the examples set for the herein, but is to be accorded the broadest scope consistent with the principles and features disclosed herein.

The implementations of the present disclosure may be used in a BS, a UE, or other equipment in a wireless communication system.

The invention claimed is:

1. A method of performed by a user equipment (UE), the method comprising:

monitoring a system information block 1 (SIB1) of a first cell on the first cell with a first periodicity;

receiving a configuration related to a network energy saving (NES) mode for the first cell, wherein the configuration related to the NES mode for the first cell includes information regarding a time period for the NES mode and cell information regarding a second cell; and monitoring the S1B1 of the first cell on the second cell within a first time period, based on the first cell being in the NES mode.

2. The method of claim 1, further comprising:

monitoring a synchronization signal block (SSB) of the first cell on the first cell, based on the first cell not being in the NES mode; and monitoring the SSB of the first cell on the second cell within the first time period, based on the first cell being in the NES mode.

3. The method of claim 1, comprising:

detecting a group-common downlink control information (DCI) format for the first cell to transition to the NES mode.

4. The method of claim 3, wherein the information regarding the time period for the NES mode includes configurations for a plurality of time periods, and wherein the group-common DCI format includes information regarding the first time period among the plurality of time periods.

5. The method of claim 3, further comprising: transmitting an acknowledgment (ACK) or a negative ACK (NACK) for transitioning to the NES mode based on the group-common DCI format.

6. The method of claim 1, comprising:

based on the first cell being in the NES mode:

monitoring a physical downlink control channel (PDCCH) for the S1B1 of the first cell on the first cell;

transmitting an S1B1 request on a random access channel (RACH) resource related to a first PDCCH that schedules the SIB1 of the first cell, based on detection of the first PDCCH; and receiving a physical downlink shared channel (PDSCH) carrying the SIB1 on the first cell, based on the transmission of the SIB1 request.

7. A user equipment (UE) comprising:

at least one transceiver;

at least one processor; and at least one computer memory operably connected to the at least one processor and configured to store instructions that, when executed, cause the at least one processor to perform operations comprising:

monitoring a system information block 1 (SIB1) of a first cell on the first cell with a first periodicity;

receiving a configuration related to a network energy saving (NES) mode for the first cell, wherein the configuration related to the NES mode includes information regarding a time period for the NES mode and cell information regarding a second cell; and monitoring the S1B1 of the first cell on the second cell within a first time period, based on the first cell being in the NES mode.

8. A base station (BS) comprising:

at least one transceiver;

at least one processor; and at least one computer memory operably connected to the at least one processor and configured to store instructions that, when executed, cause the at least one processor to perform operations comprising:

transmitting a system information block 1 (SIB1) of a first cell on the first cell with a first periodicity;

transmitting a configuration related to a network energy saving (NES) mode for the first cell, wherein the configuration related to the NES mode for the first cell includes information regarding a time period for the NES mode and cell information regarding a second cell; and transmitting the S1B1 of the first cell on the second cell within a first time period, based on the first cell being in the NES mode.

9. The BS of claim 8, wherein the operations further comprise:

transmitting a synchronization signal block (SSB) of the first cell on the first cell, based on the first cell not being in the NES mode; and transmitting the SSB of the first cell on the second cell within the first time period, based on the first cell being in the NES mode.

10. The BS of claim 8, wherein the operations comprise transmitting a group-common downlink control information (DCI) format for the first cell to transition to the NES mode.

11. The BS of claim 10, wherein the information regarding the time period for the NES mode includes configurations for a plurality of time periods, and wherein the group-common DCI format includes information regarding the first time period among the plurality of time periods.

12. The BS of claim 10, wherein the operations further comprise receiving an acknowledgment (ACK) or a negative ACK (NACK) for transitioning to the NES mode in response to the transmission of the group-common DCI format.

13. The BS of claim 8, wherein the operations comprise: based on the first cell being in the NES mode:

transmitting a first physical downlink control channel (PDCCH) that schedules the SIB1 of the first cell on the first cell; and transmitting a physical downlink shared channel (PDSCH) carrying the SIB1, based on reception of an S1B1 request on a random access channel (RACH) resource related to the first PDCCH.

14. The method of claim 1, wherein the SIB1 of the first cell is present on the first cell with a second periodicity longer than the first periodicity based on the first cell being in the NES mode.

15. The method of claim 1, wherein the SIB1 of the first cell is absent on the first cell in the first time period based on the first cell being in the NES mode.

16. The method of claim 2, wherein the SSB of the first cell is absent on the first cell in the first time period based on the first cell being in the NES mode.

17. The BS of claim 8, wherein the SIB1 of the first cell is transmitted on the first cell with a second periodicity longer than the first periodicity based on the first cell being in the NES mode.

18. The BS of claim 8, wherein the SIB1 of the first cell is absent on the first cell in the first time period based on the first cell being in the NES mode.

19. The BS of claim 9, wherein the SSB of the first cell is absent on the first cell in the first time period based on the first cell being in the NES mode.

* * * * *